Aug. 1, 1939.　　　M. M. GOLDBERG　　　2,167,714
ACCOUNTING MACHINE

Original Filed Aug. 27, 1931　　24 Sheets-Sheet 1

Inventor
Maximilian M. Goldberg
By
Earl Berist
His Attorney

Aug. 1, 1939.   M. M. GOLDBERG   2,167,714
ACCOUNTING MACHINE
Original Filed Aug. 27, 1931   24 Sheets—Sheet 2

Inventor
Maximilian M. Goldberg
By Carl Beust
His Attorney

Aug. 1, 1939. M. M. GOLDBERG 2,167,714
ACCOUNTING MACHINE
Original Filed Aug. 27, 1931 24 Sheets-Sheet 3

Inventor
Maximilian M. Goldberg
By Carl Beust
His Attorney

Aug. 1, 1939.   M. M. GOLDBERG   2,167,714
ACCOUNTING MACHINE
Original Filed Aug. 27, 1931   24 Sheets-Sheet 4

Inventor
Maximilian M. Goldberg
By  Carl Beust
His Attorney

Aug. 1, 1939. M. M. GOLDBERG 2,167,714
ACCOUNTING MACHINE
Original Filed Aug. 27, 1931 24 Sheets-Sheet 5

Inventor
Maximilian M. Goldberg
By Earl Benst
His Attorney

Inventor
Maximilian M. Goldberg
By
Carl Berst
His Attorney

Aug. 1, 1939. M. M. GOLDBERG 2,167,714
ACCOUNTING MACHINE
Original Filed Aug. 27, 1931 24 Sheets-Sheet 7

Inventor
Maximilian M. Goldberg
By Carl Beust
Attorney

Aug. 1, 1939.　　　M. M. GOLDBERG　　　2,167,714
ACCOUNTING MACHINE
Original Filed Aug. 27, 1931　　24 Sheets-Sheet 8

Inventor
Maximilian M. Goldberg
By
Carl Beust
Attorney

Aug. 1, 1939.  M. M. GOLDBERG  2,167,714
ACCOUNTING MACHINE
Original Filed Aug. 27, 1931   24 Sheets—Sheet 9

Inventor
Maximilian M. Goldberg
By Carl Beust
His Attorney

Aug. 1, 1939.  M. M. GOLDBERG  2,167,714
ACCOUNTING MACHINE
Original Filed Aug. 27, 1931  24 Sheets-Sheet 10
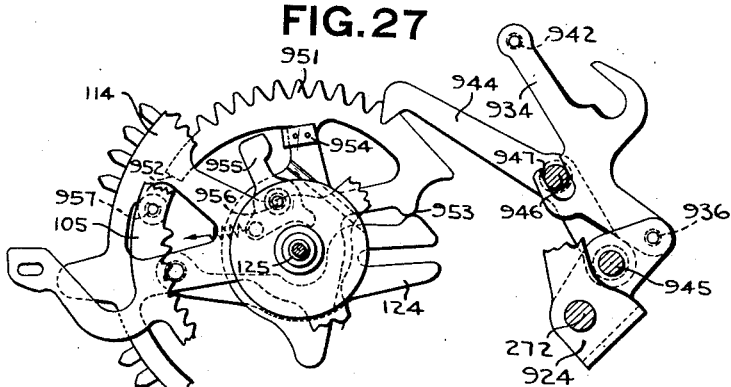
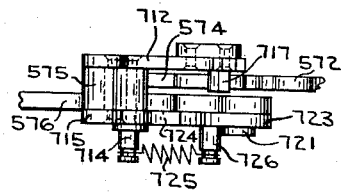
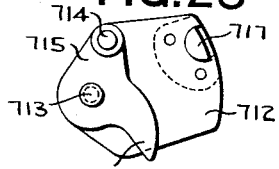
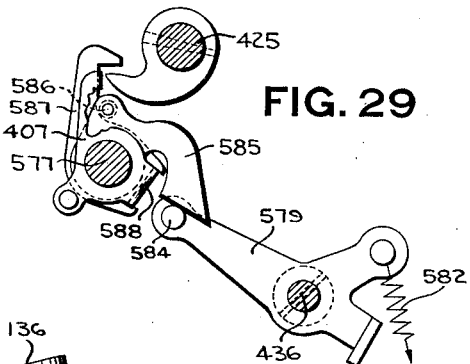
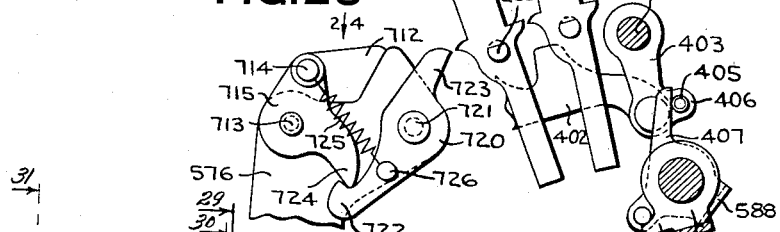
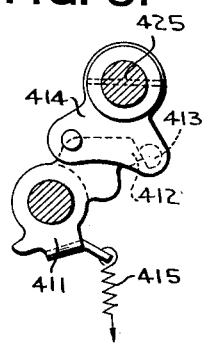
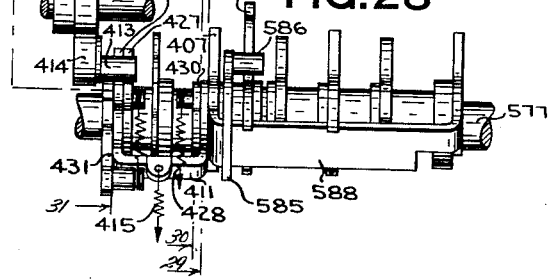
Inventor
Maximilian M. Goldberg
By Carl Beust
His Attorney Aug. 1, 1939.  M. M. GOLDBERG  2,167,714
ACCOUNTING MACHINE
Original Filed Aug. 27, 1931   24 Sheets-Sheet 11
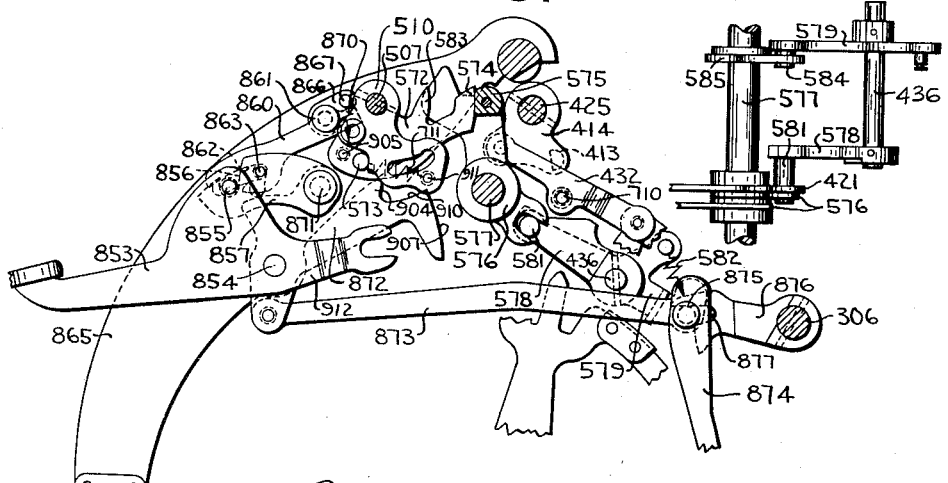
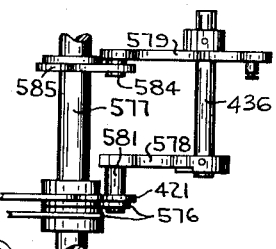
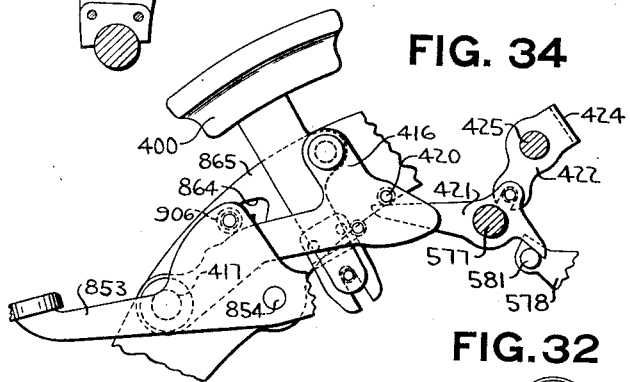
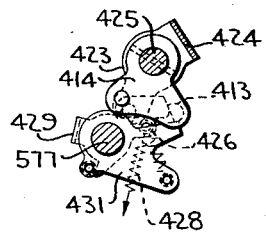
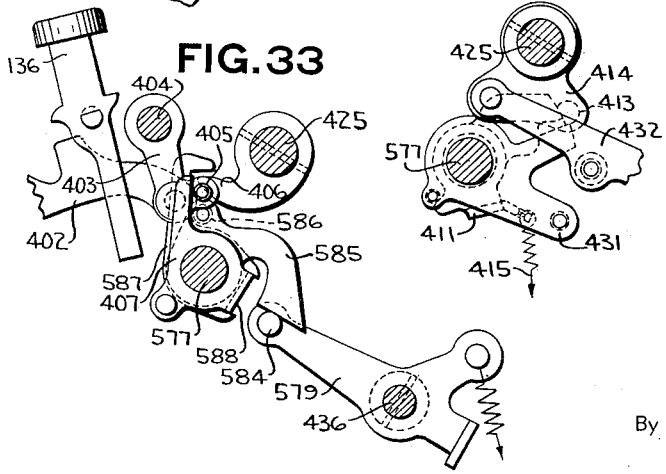
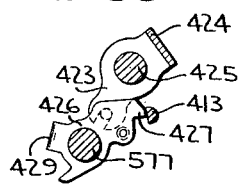
Inventor
Maximilian M. Goldberg
By
His Attorney Aug. 1, 1939.  M. M. GOLDBERG  2,167,714
ACCOUNTING MACHINE
Original Filed Aug. 27, 1931   24 Sheets-Sheet 12

Inventor
Maximilian M. Goldberg
By Carl Beust
His Attorney

Aug. 1, 1939. M. M. GOLDBERG 2,167,714
ACCOUNTING MACHINE
Original Filed Aug. 27, 1931 24 Sheets-Sheet 13

Inventor
Maximilian M. Goldberg
By *Earl Beust*
His Attorney

Aug. 1, 1939.　　　M. M. GOLDBERG　　　2,167,714
ACCOUNTING MACHINE
Original Filed Aug. 27, 1931　　24 Sheets—Sheet 14

Inventor
Maximilian M. Goldberg
By
His Attorney

Aug. 1, 1939.     M. M. GOLDBERG     2,167,714
ACCOUNTING MACHINE
Original Filed Aug. 27, 1931     24 Sheets-Sheet 15

Inventor
Maximilian M. Goldberg
By Karl Beust
His Attorney

Aug. 1, 1939.  M. M. GOLDBERG  2,167,714
ACCOUNTING MACHINE
Original Filed Aug. 27, 1931  24 Sheets-Sheet 18

Inventor
Maximilian M. Goldberg
By *Earl Beust*
His Attorney

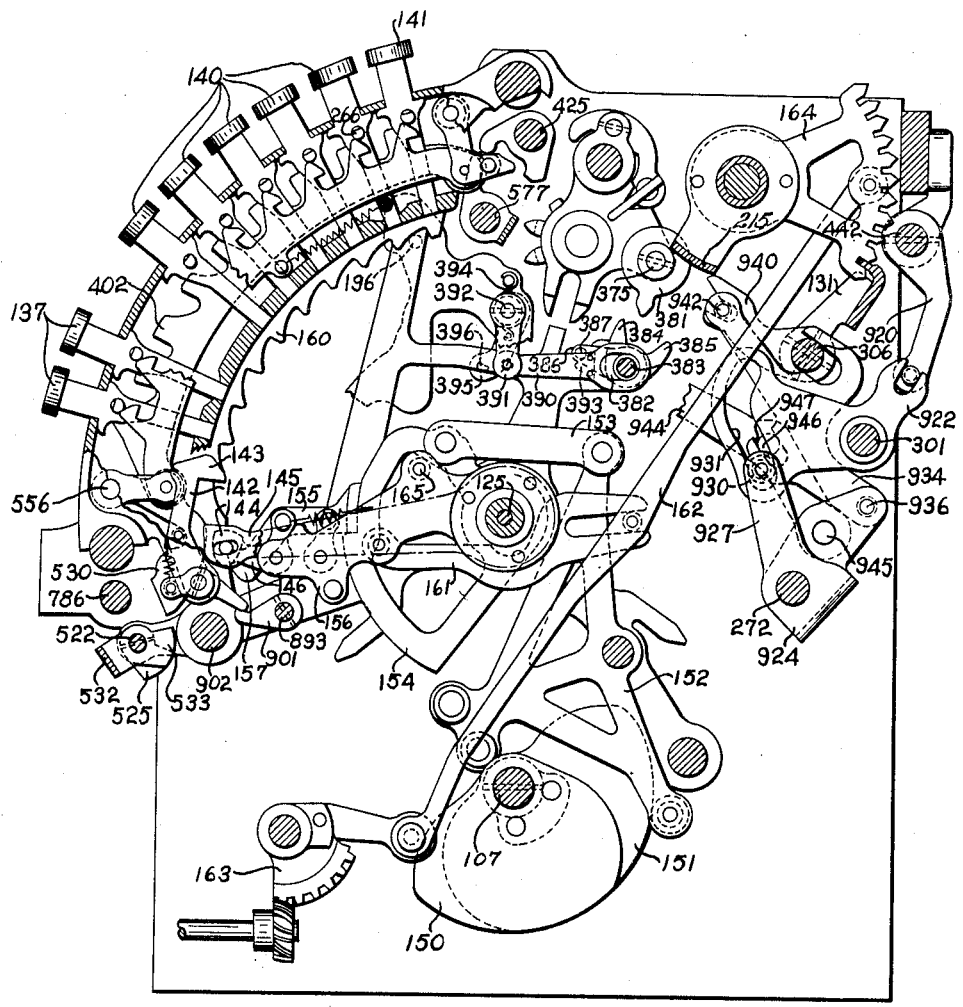

Aug. 1, 1939.    M. M. GOLDBERG    2,167,714
ACCOUNTING MACHINE
Original Filed Aug. 27, 1931    24 Sheets-Sheet 20

Inventor
Maximilian M. Goldberg
By Carl Beust
His Attorney

Aug. 1, 1939.   M. M. GOLDBERG   2,167,714
ACCOUNTING MACHINE
Original Filed Aug. 27, 1931   24 Sheets—Sheet 21

Inventor
Maximilian M. Goldberg
By Carl Benst
His Attorney

Aug. 1, 1939.  M. M. GOLDBERG  2,167,714
ACCOUNTING MACHINE
Original Filed Aug. 27, 1931  24 Sheets—Sheet 24

FIG. 61

JOHN DOE COMMERCIAL BANK
ANYWHERE, OHIO

ND — Notes Discounted
IN — Interest
CL — Collection
+ — Deposit
− — Clearing House
US — Counter Checks
CH — Collection Charges
CC — Certified Checks

| | MEMO | DATE | CHECKS | CHECKS | DEPOSITS | TR. DATE | BALANCE |
|---|---|---|---|---|---|---|---|
| 1 | | 1 * | 2.50* | 5.00* | 250.00 + | US | |
| 2 | | 2 * | 3.00* | 1.25 | | — | |
| 3 | | 3  7-1-31 * | 10.00 | | | — 7-1 • | 228.25 |
| 4 | | 4 * | 5.00* | 7.50 | | — | |
| 5 | | 5 * | 10.00* | 20.00 | | — | |
| 6 | | 6 * | 50.00* | 2.00 | | — | |
| 7 | | 7  7-9-31 * | 1.00 | | | — 7-9 • | 132.75 |
| 8 | | 8 * | 50.00* | 70.00 | | US | |
| 9 | | 9 * | 10.00* | 5.00 | | — | |
| 10 | | 10 7-12-31 * | 1.00 | | | US 7-12 | Σ 0,000,003.25 |
| 11 | | 11 | | | | | |
| 12 | | 12 | | | | | |
| 13 | | 13 | | | | | |
| 14 | | 14 | | | | | |
| 15 | | 15 | | | | | |
| 16 | | 16 | | | | | |
| 17 | | 17 | | | | | |
| 18 | | 18 | | | | | |
| 19 | | 19 | | | | | |
| 20 | | 20 | | | | | |
| 21 | | 21 | | | | | |
| 22 | | 22 | | | | | |
| 23 | | 23 | | | | | |
| 24 | | 24 | | | | | |
| 25 | | 25 | | | | | |
| 26 | | 26 | | | | | |
| 27 | | 27 | | | | | |
| 28 | | 28 | | | | | |
| 29 | | 29 | | | | | |
| 30 | | 30 | | | | | |
| 31 | | 31 | | | | | |

Inventor
Maximilian M. Goldberg
By
Carl Baust
His Attorney

Patented Aug. 1, 1939

2,167,714

UNITED STATES PATENT OFFICE 2,167,714

ACCOUNTING MACHINE

Maximilian M. Goldberg, Dayton, Ohio, assignor to The National Cash Register Company, Dayton, Ohio, a corporation of Maryland Original application August 27, 1931, Serial No. 559,720. Divided and this application August 18, 1934, Serial No. 740,412

28 Claims. (Cl. 235—8)

This invention relates to business machines and more particularly to that type involving the adding and subtracting of amounts, the totaling and repeating of those amounts, and the transferring of them from one register to another and is a division of my copending application Serial No. 559,720 filed August 27, 1931.

The present embodiment of the invention shows it in connection with a machine adapted to compute balances of customer's accounts in banking houses and the like, but it is to be understood that the invention can as readily be applied to other machines in the field of computing and accounting.

One of the objects of this invention is to provide a machine capable of balancing, totaling, repeating, and transferring totals of amounts, with a minimum of mental and physical manipulation on the part of the operator. Other objects of the invention are, to provide an improved total reading and resetting mechanism, and one which will not require the depression of the customary motor bar; to provide suitable interlocks between the various keys; to provide a novel device to prevent repeated operations of the machine if a total key is held depressed during an entire operation; to provide an improved mechanism to automatically select the proper side of the add and subtract, or "Balance" totalizer upon depression of a transaction key; to provide a novel overdraft mechanism, to add to the totalizer the fugitive unit whenever the totalizer passes through zero; to provide a novel mechanism to automatically shift the add and subtract totalizer for a total reading and resetting operation, so as to show the algebraic total standing thereon; to provide an improved repeat mechanism; to provide a mechanism to automatically select a totalizer in accordance with the algebraic state of the number standing on another totalizer, and also to automatically enter this number in the selected totalizer simply by the depression of a key.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow:

Fig. 24 is a plan view of the non-repeat mechanism, looking in the direction of the arrow 24, Fig. 26.

Figs. 25 and 26 are detail views of parts of the mechanism shown in Fig. 22, as seen from the opposite side.

Fig. 27 is a detail view of parts of the repeat mechanism in connection with the differential mechanism.

Fig. 28 is a back view of the machine release mechanism.

Fig. 29 is a detail view looking in the direction of the arrow in Fig. 28 of parts of the machine release mechanism, employed to remove the left hand releasing block, as viewed in Fig. 28, when a total key is depressed.

Fig. 30 is a detail view looking in the direction of the arrow in Fig. 28, of parts of the machine release mechanism employed to remove the left hand releasing block, as viewed in Fig. 28, when a transaction key is depressed.

Fig. 31 is a detail view looking in the direction of the arrow in Fig. 28, of the left hand block, and its connection with the blocked member.

Fig. 32 is a view similar to Fig. 31, but also showing the non-repeat pawl.

Fig. 33 is a view similar to Fig. 29, showing parts of Fig. 30, in connection therewith.

Fig. 34 is a detail view of parts of the key release mechanism in connection with the motor bar and the repeat key.

Fig. 35 is a detail view of a part of the mechanism shown in Fig. 34, in association with the right hand releasing block, as seen in Fig. 28.

Fig. 36 is a view similar to Fig. 35, but also showing the non-repeat pawl and the association of this pawl and the block to the blocked member.

Fig. 37 is a side elevation of parts of the machine release mechanism controlled by the total and repeat keys, and also of the engaging means for the automatic selecting device.

Fig. 38 is a detail plan view of certain parts shown in Figs. 33, 34 and 37.

Fig. 52 is a side elevation of the third transaction key bank, showing the parts of the overdraft and repeat mechanisms shown on the left side of Figs. 49 and 58.

Fig. 53 is a detail view of parts of the repeat mechanism shown in Figs. 52 and 55.

Fig. 54 is a detail view of parts of the repeat mechanism shown in Fig. 55.

Fig. 61 is a facsimile of the statement sheet such as may be prepared and printed in the machine disclosed herein.

General description

Figure 1:
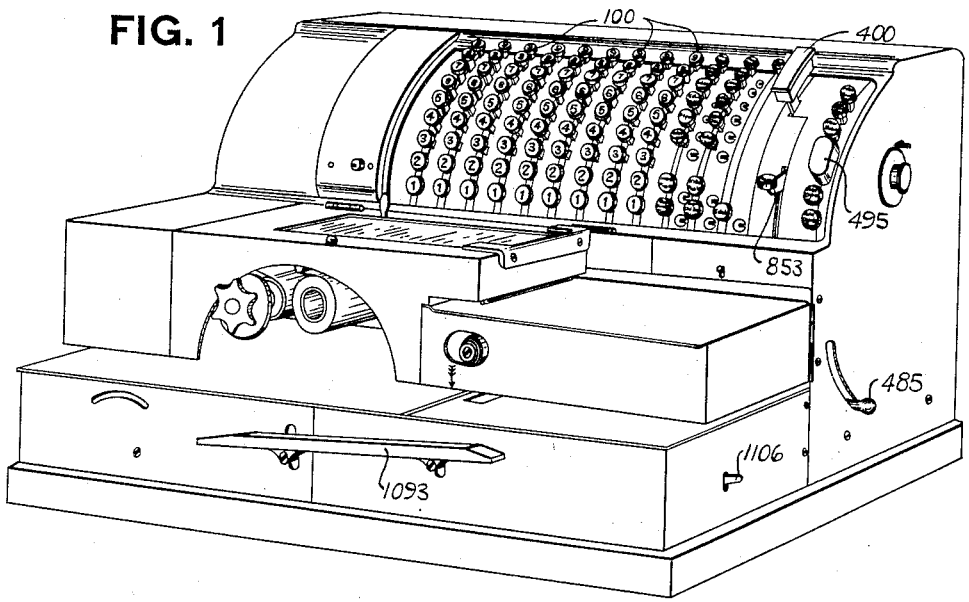
Fig. 1 is a perspective of the machine.

This machine is adapted to be used in computing and balancing bank depositors' accounts, involving old balances, various forms of deposits, checks drawn, and new balances computed.

The machine has the ordinary amount keys, and has three banks of transaction keys. The keys in the first, or right hand transaction bank are used solely for controlling the printing mechanism which may be used in connection with this machine. The keys in the second and third transaction banks are used to denote old balances, deposits, and withdrawals. The depression of these second and third bank keys, aside from controlling the totalizer cooperating with each key, controls the movement of the differential mechanism in the first transaction bank. This in turn, controls the shifting of an add and subtract, or "Balance" totalizer, used as a listing register for accumulating the amounts involved in one account. When one of the keys denoting an additive item is depressed, the differential mechanism in the first transaction bank is automatically freed for a movement sufficient to allow it to shift the "Balance" totalizer to its additive side, and similarly the movement of the differential mechanism is restricted sufficient to allow it to shift the "Balance" totalside when a key denoting a subtractive item is depressed.

When it is desired to take a total of, or "balance" the items accumulated on the statement sheet, one of the "New balance" total keys is depressed, and by this depression, the machine is started on a total reading or resetting operation, printing, and either resetting or reading the balance appearing on the "Balance" totalizer, If it is desired to accumulate these totals taken off the "Balance" totalizer, the "Repeat" key is then depressed. This key, aside from performing its ordinary amount repeating function, engages, for operation a mechanism that automatically selects in accordance with the algebraic state of the number, a totalizer into which the repeated number is to be entered. This selecting is performed by what is known in the art as overdraft mechanism, designed to add a unit to the totalizer whenever the latter passes through zero. This overdraft mechanism is so connected with the repeat mechanism, that a totalizer in the second transaction bank is selected if the number being entered is positive, and one in the third transaction bank is selected if the number is negative.

When it is desired to read or reset the amount standing on the individual totalizer of any of the keys in the second or third transaction banks, for instance the total of the amounts entered as certified checks, it is necessary to first depress the "Certified checks" key, and then depress the "Read" or "Reset" key for the second transaction bank.

When it is desired to read or reset the total amount of deposits entered by the various deposit keys, the "Read" or "Reset" key for the second transaction bank is alone depressed. This reads or resets the total from the totalizer of the zero position in the second bank, which is the grand totalizer for the deposit keys in the third bank. Likewise, when it is desired to read or reset the total amount of checks entered under the various check keys, the "Read" or "Reset" key for the third transaction bank is alone depressed. This reads or resets the total from the totalizer of the zero position in the third bank, which is the grand totalizer for the check keys in the second bank.

*Detailed description adding and lubricating*

1. Amount keys and their differential mechanism.
2. Totalizers—in general.
3. Transaction keys and their differential mechanism.
4. Totalizer control by transaction keys—in general.
5. Same—lateral shifting of totalizers.
6. Same—totalizer selecting plates.
7. Same—totalizer engaging mechanism.
8. Same—shifting of balance totalizer under control of keys in the second and third transaction banks.
9. Transfer mechanism.
10. Automatic overdraft mechanism.
11. Operation of overdraft mechanism.
12. Machine release mechanism for adding and subtracting operations.
13. Driving mechanism.
14. Restoring mechanism for adding and subtracting operations—restoring of machine release.
15. Same—restoring of parts of balance totalizer shift control.
16. Restoring mechanism—automatic key release and disconnecting and stopping of motor.
17. Same—manual key release.
18. Adding operation.
19. Subtracting operation.

*Total reading and resetting*

20. Reading and resetting operations in general.
21. Total keys and their interlocks with each other and with the transaction keys.
22. Machine release mechanism for total reading and resetting operations.
23. Automatic positioning of the total plate.
24. Engaging of the cycle control for total reading and resetting operations.
25. Cycle control and machine release restoring mechanism for total reading and resetting operations.
26. Nonrepeat mechanism for total keys.
27. Totalizer selection for total reading and resetting operations—selection of totalizer line for engagement.
28. Same—automatic selection of adding or subtracting side of the balance totalizer.
29. Same—lateral shifting of totalizers for second and third transaction banks.
30. Control of amount key banks during total reading and resetting operations.
31. Totalizer engaging mechanism for total reading and resetting operations.
32. Selection of reset shaft and operation of reset spider.
33. Total reading operation.
34. Total resetting operation.
35. Adding or subtracting operation after a total resetting operation.
36. Visual indication of negative total.

*Repeating*

37. Automatic selection of totalizer to receive repeated amount.
38. Manual selection of totalizer to receive repeated amount.
39. Machine release mechanism for repeating operations.
40. Interlocks with the repeat key.
41. Control of amount differentials during repeating operations.
42. Repeating operation using automatic selection of the totalizer.
43. Repeating operation using manual selection of the totalizer.

*1. Amount keys and their differential mechanism*

This machine, as shown, has nine banks of amount keys 100, Fig. 1, arranged on the left side of the keyboard. These key banks, and their differential mechanisms are fully shown and described in the United States Patent No. 1,619,796, to B. M. Shipley, and will therefore be only briefly described here. Each bank, Figs. 1, 2 and 55, has nine keys numbered "1" to "9" consecutively, the "9" keys situated at the top of each bank. The keys are mounted in frames 101, and are held in their undepressed position by springs 102. The depression of a key swings the zero stop pawl 103 of its bank, counter-clockwise, out of the path of the nose 104 on the reset spider 105, and projects the lower end of the key into the path of the latch breaking lever 106. When the machine is operated, the main drive shaft 107 rotates the companion cams 110, 111, a pair of which are located under the differential mechanism for each key bank. The rotation of the cam 110 moves the bell crank 112 and the actuator 113, the latter rotating the differential rack 114 clockwise until the latch breaking lever 106 strikes the lower end of the depressed key 100. This striking disengages or "breaks," the latch 115, forcing its nose 116 into the notch 117 under the depressed key. In this movement the reset spider 105 is arrested as soon as the lever 106 strikes the depressed key, and the rack 114 continues to rotate until the latch 116 is seated in the notch 117. The actuator 113 then continues its clockwise movement, while the rack 114 is held stationary by the engagement of the nose 116 with the notch 117. When the actuator 113 reaches the end of its clockwise movement, whatever totalizer lines 120, 121, 122 are selected under control of the transaction keys, are engaged with the differential rack 114 (see timing of amount differentials and totalizer engaging, adding operation in Fig. 60) and remain in that position while the cam 111 returns the differential unit, counter-clockwise to its home position shown in Fig. 55. This counter-clockwise movement runs the number corresponding to the key depressed, on the selected totalizers. When the cam 110 rotates the bell-crank 112 clockwise, the stud 123 on the bell-crank moves into engagement with the lower edge of the beam 124, and upon continued movement forces the beam against the rod 125. The forward end of the beam is pivoted to the differential rack 114, the clockwise movement of which is completed when the beam is forced against the rod 125. Since the beam is rigidly held at these two points when the differential rack 114 is arrested in the position determined by the depressed amount key 100, its position for the present operation is determined, and the link 126 connecting the type-setting segment 127 and the aliner segment 130 with the beam 124 is likewise positioned, setting the printing type in the position corresponding to the amount key depressed in that bank. The aliner 131 receives a slight clockwise rotation before the beam 124 is adjusted, to free the segment 130 for movement by the link 126 (see timing of amount differentials and aliner 131, Fig. 60). The aliner 131 then remains in its rotated position until after the amount differential receives its clockwise movement, at which time the aliner is returned, by a counter-clockwise movement, to its normal position. The aliner is given these movements by an actuator 128, Fig. 58, operated by two cams on the drive shaft 107 and connected to the aliner through a link 129.

2. *Totalizers—in general*

This machine has three lines of totalizers, an upper line 120, a back line 121, and a front line 122. The upper line 120 carries only an add and subtract totalizer, also termed hereafter the "Balance" totalizer, having an adding side carrying the wheels 118, Fig. 49 and a subtracting side carrying the wheels 119, which are connected to each other in the usual manner, while the back and front lines 121, 122 each carry nine interspersed totalizers. This arrangement is well known in the art, as shown by Patent No. 1,242,170 granted to F. L. Fuller, October 9, 1917, and will therefore not be further described.

3. *Transaction keys and their differential mechanism*

Figure 2:
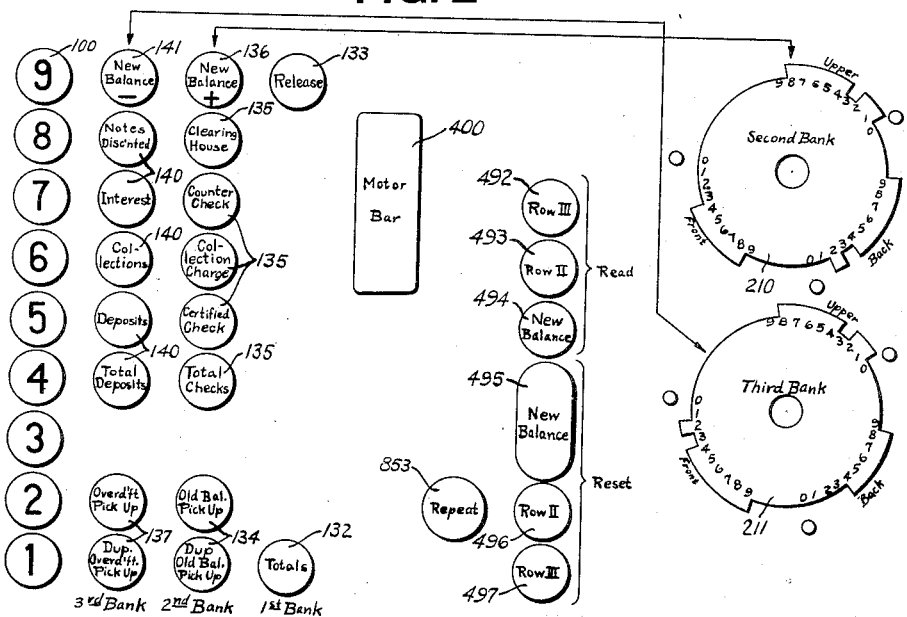
Fig. 2 is a diagrammatic view of the keyboard arrangement.

The machine has three banks of transaction keys. Figs. 1, 2, 39, 41, 44, 46 and 52. As seen in Fig. 2 the first transaction bank has only two keys 132, 133, one designated "Totals" and the other "Release." These two keys are used only in connection with the special type of printer used on this machine and consequently, need not be further explained here.

The second transaction bank has eight keys, two 134, bearing the designations of "Old balance pick up" and "Duplicate old balance pick up," the next five, 135, bearing the designations of various forms of checks, and in the "9" position, one 136, bearing the designation "New balance."

The third transaction bank also has eight keys, two 137, bearing the designations "Overdraft pick up" and "Duplicate overdraft pick up," the next five, 140, bearing the designations of various forms of deposits, and, in the "9" position one, 141, bearing the designation "New balance —."

The differential mechanism for the second and third banks of transaction keys operates the same as that fully shown and described in the United States patent to Shipley, No. 1,703,959, and will therefore be only briefly described.

When one of the keys 137, 140, 141, Fig. 52 is depressed, the zero stop pawl 142 is swung to the left a distance sufficient to move its nose 143 out of the path of the nose 144 on the arm 145, and the lower end of the key is protruded into the path of the latch breaking lever 146. When the machine is subsequently operated, the main drive shaft 107 rotates the pair of companion cams 150, 151, the cam 150 of which rotates clockwise the bell-crank 152, pulling the link 153 to the right, and, through this link, rotating clockwise, the actuator 154, the latch 155, the latch supporting arm 156 and the arm 145. This rotation continues until the lever 146 strikes the lower end of the depressed key, at which time it disengages or "breaks" the latch 155, as explained under heading 1. The disengaging of the latch 155 and its nose 157 entering one of the notches 160 holds the differential arm 156 stationary and allows the actuator 154 to continue its clockwise movement, as was also explained under heading 1. The beam 161 and the link 162 are similar to the beam 124 and link 126, Fig. 55, and are adjusted in the same manner, positioning the printing mechanism through the segment 163, and shifting the aliner segment 164 to procure the desired lateral shifting of the totalizer line controlled by this bank of keys, and also positioning the plate controlling the totalizer engaging, as will be explained hereinafter.

The aliner 131 is moved out of, and back into engagement with the segment 164 at such times as will allow the segment to be adjusted by the link 162, as explained under heading 1.

The unit is returned to home position by the cam 151 rotating the bell-crank 152 and the actuator 154 counter-clockwise, during which movement the upper part of the actuator strikes the stud 165 on the latch supporting arm 156, and through this stud returns the latch 155, and its associated parts to their home position.

The differential for the first transaction bank is similar to that of the second and third banks, except in the particulars now to be explained.

Figures 39, 40:
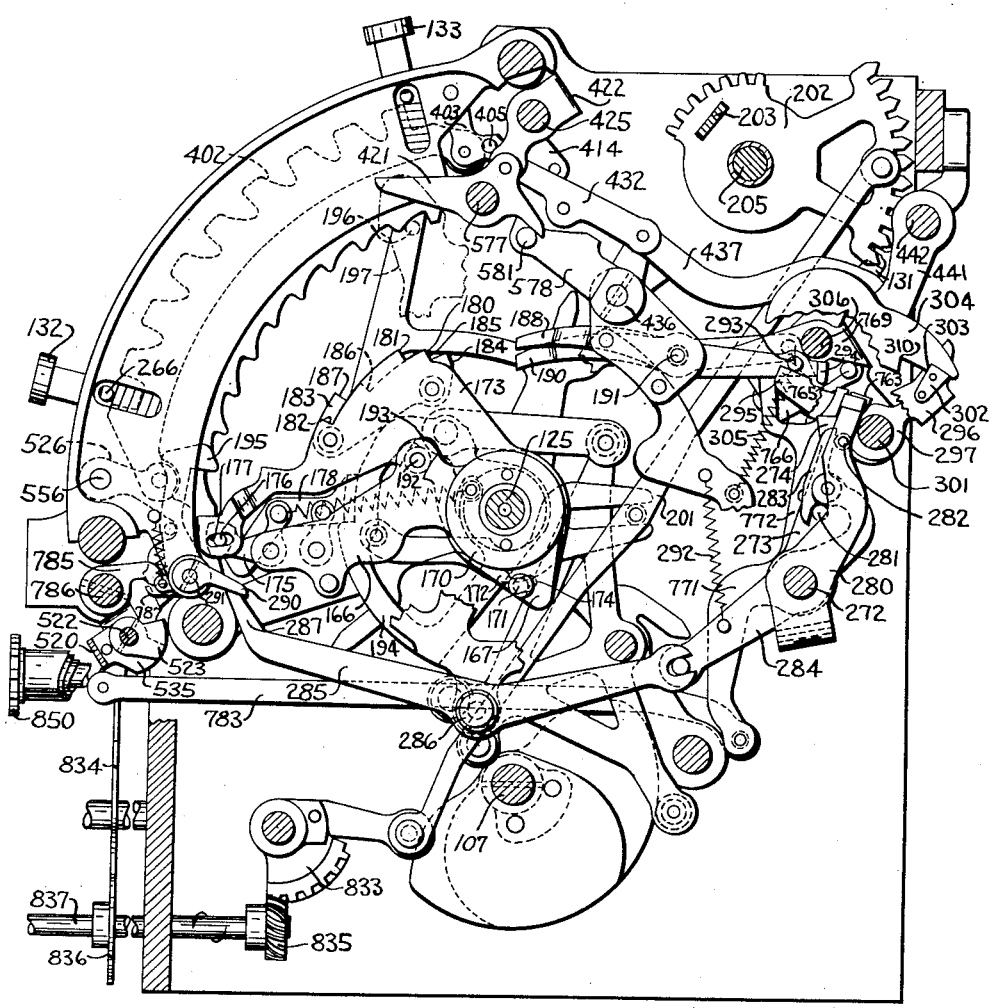
Fig. 39 is a side elevation of the first, or right hand transaction key bank as seen in Figs. 1 and 2, and also of certain controls for the key controlled and the automatic totalizer selecting mechanism for the add and subtract or "Balance" totalizer.
Fig. 40 is a front elevation of the printing element shown in Fig. 39, used for indicating an overdraft, showing its position in reference to the hammer.

The latch supporting arm 166, Fig. 39, corresponding to the latch supporting arm 156 in Fig. 52, has a projection 167 extending downwardly from its hub portion 170. A headed stud 171 is mounted on the projection 172 extending downwardly from the differential arm 173, and extends through a slot 174 in the projection 167, in which it has a limited sliding movement. The differential arm 173 is journaled, at its rear end on the rod 125, and is held at its front end to the latch breaking lever 175 by a pin 176 extending through a slot 177 in the arm 173, in a manner similar to that of the arm 145, in Fig. 52.

The stud 171 holds the differential arm 173 against side wise movement in relation to the arm 166, and the two slots 174 and 177 allow a relative movement between the arms 166 and 173, caused by the engaging and disengaging of the latch 178. On the upper edge of the differential arm 173 are formed, three shoulders 180, 181 and 182, and on the side of the arm, adjacent these shoulders is fastened a plate 183. This plate is provided with four shoulders 184, 185, 186, and 187. Two stop levers 188 and 190 are pivoted at 191, and are free to be swung into, and out of the paths of the arm 173 and plate 183. When either stop arm is adjusted to lie in the path of one of these shoulders, during an operation of the machine, the clockwise movement of the differential mechanism brings one of the shoulders into abutting relation with the adjusted stop lever, arresting the movement of the arm 173.

The latch breaking lever 175, being held, on its outer end, to the arm 173, by the pin-and-slot connection 176, 177 is rotated counter-clockwise by the continued upward movement of the latch 178. This counter-clockwise rotation of the lever 175 disengages the latch 178, and brings the mechanism to rest as in the other differentials described above.

A stud 192, similar to stud 165, Fig. 52, is fastened in the arm 166, extends through a slot 193 in the arm 173, and lies in the path of the actuator 194, to cooperate with the latter in returning the mechanism to home position.

The shoulders 180, 181, 182, 184, 185, 186 and 187 are arranged so that when shoulder 184 abuts its stop lever 190, the differential stops in the position corresponding to that in which an amount differential stops when a "2" key is depressed, commonly known as the "2" position. When either of the shoulders 180 or 185, abuts its stop lever, the differential stops in the "3" position, and so on, the shoulder 181 stopping it in the "4" position, the shoulder 186 stopping it in the "6" position, the shoulder 187 stopping it in the "7" position, and the shoulder 182 stopping it in the "8" position.

When the zero stop pawl 195 is moved, and the stop levers 188 and 190 are both swung out of the paths of the shoulders, the arm 173 will be free to travel to the end of its path, where the forward end of the arm 173 strikes the stud 196, mounted in the frame 197, disengaging the latch and arresting the mechanism in the "9" position.

4. *Totalizer control by transaction keys—in general*

Figure 55:
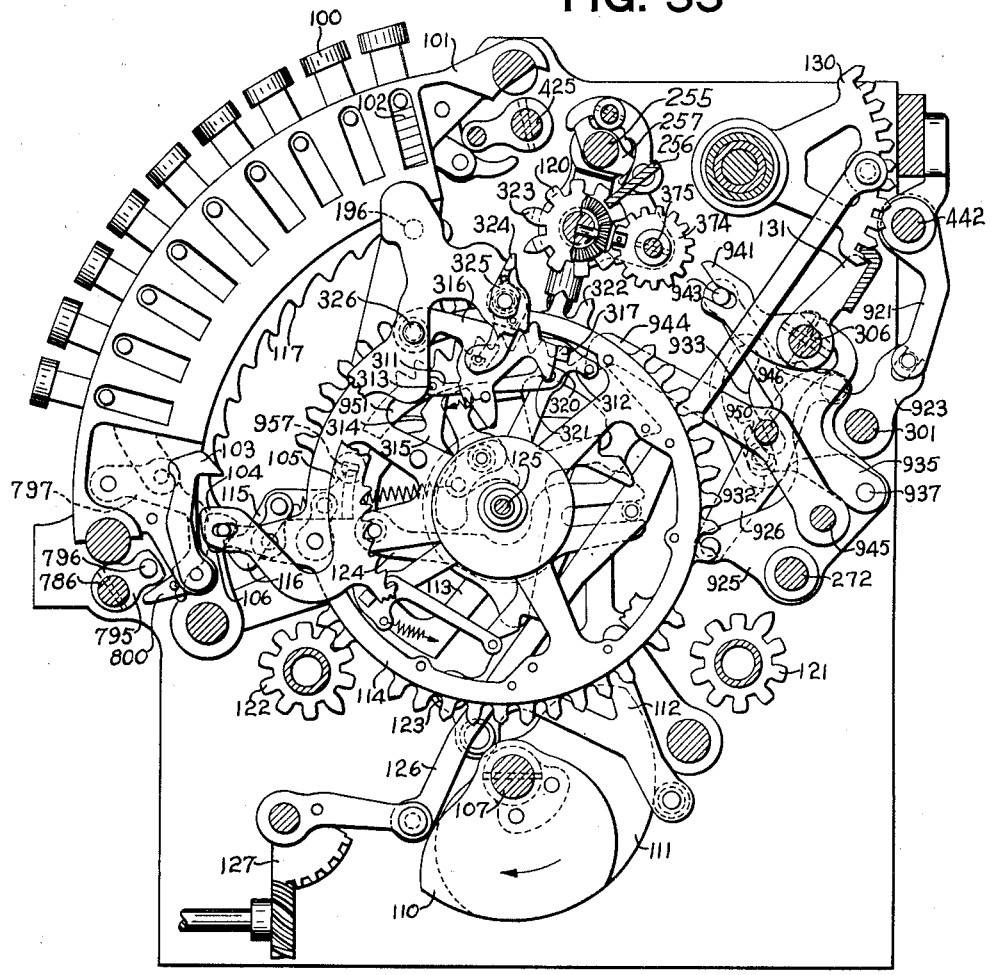
Fig. 55 is a side elevation of an amount key bank, showing the parts of the overdraft and repeat mechanisms shown on the right side of Figs. 49 and 59.

The three totalizer lines are shifted laterally under control of the differentials for the three banks of transaction keys, the differential for the first bank controlling the shifting of the balance (upper) totalizer line 120, Fig. 55, the differential for the second bank controlling the shifting of the rear totalizer line 121, and the differential for the third bank controlling the shifting of the front totalizer line 122. The keys 134, 135, 137, and 140, Fig. 2 aside from controlling the shifting of the totalizer lines 121, 122, for their respective banks, control the shifting of the balance totalizer 120. Whenever one of these keys is depressed, the differential for the first bank is released for adjustment, and when adjusted, shifts the balance totalizer to the add or subtract position as determined by the transaction key depressed. The number set on the amount keys for this transaction can then be properly entered into the balance totalizer as well as into the individual totalizer for the particular transaction key depressed.

The mechanism controlling the engaging of the various totalizers upon the depression of the various transaction keys, operates according to the following plan:

When the upper one of the keys 134 is depressed, the rear and upper totalizer lines are engaged, the amount set up being accumulated on the individual totalizer of the depressed key, and on the balance totalizer, and when the lower key 134 is depressed, only the upper, or balance totalizer is engaged.

When a key 135 is depressed, all three totalizer lines are engaged, the amount set up being accumulated, on the individual totalizer of the depressed key 135, lying in the rear line 121, on the balance totalizer 120, and on the grand totalizers for the second bank located in the "zero" position of the front line 122, which is used to obtain the total amount of "Checks" entered by these keys 135.

When the key 136 is depressed, the rear totalizer line alone is engaged, the amount being accumulated on the individual totalizer for the key 136.

When the upper one of the keys 137 is depressed, the front and upper totalizer lines are engaged, the amount being accumulated on the individual totalizer of the depressed key, and on the balance totalizer, and when the lower key 137 is depressed, only the upper, or balance totalizer is engaged.

When a key 140 is depressed, all three totalizer lines are engaged, the amount being accumulated, in the front line, on the individual totalizer of the depressed key 140, on the balance totalizer, and on the grand totalizer for the third bank, situated in the "Zero" position of the rear line, and is used to obtain the total amount of "Deposits" entered by these keys 140.

When the key 141 is depressed, the front totalizer line alone is engaged, the amount being accumulated on the individual totalizer for the key 141.

5. *Totalizer control by transaction keys—Lateral shifting of totalizers*

Figure 49:
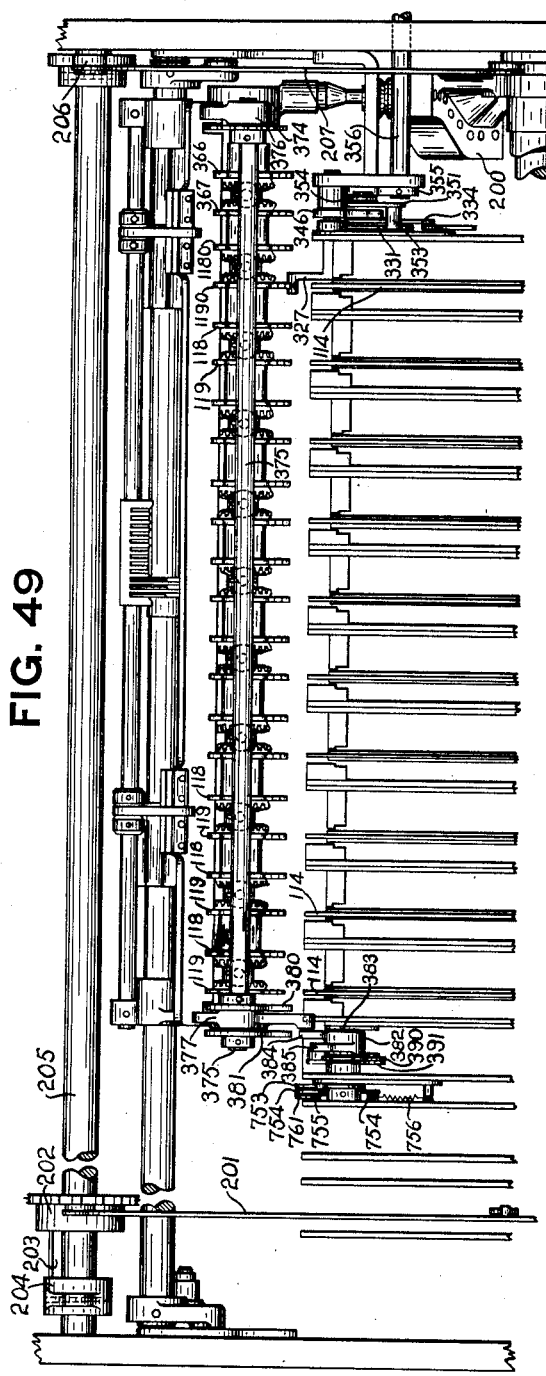
Fig. 49 is a back view of the overdraft mechanism, looking in the direction of the arrows 49—49, Fig. 47, and also of the mechanism for shifting the add and subtract, or "Balance" totalizer.
Figure 51:
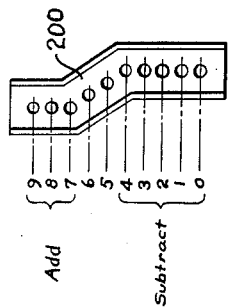
Fig. 51 is a diagrammatic view of the shifting cam for the add and subtract, or "Balance" totalizer.

Referring to Figs. 39, 49 and 51, when the differential in the first transaction bank receives a movement, the shifting cam 200, Fig. 49, through the link 201, Fig. 39, the segment 202, the yoke 203, Fig. 49, the collar 204, the shaft 205, the arm 206, and the link 207, is given a proportionate movement, shifting the balance totalizer from its adding to its subtracting position, or vice versa, whenever the movement of the arm 173 is through the "5" and "6" positions. When the movement is not sufficient to carry the arm through these positions, the totalizer does not shift for that operation. When the arm is stopped in the "6" position, the balance totalizer can take no part in the operation, since neither the adding wheels 118, nor the subtracting wheels 119, are in line with the differential racks 114. When the arm is stopped in one of the positions "0" to "4," the totalizer assumes its subtracting position, and when stopped in one of the positions "7" to "9," it assumes its adding position.

The differential for the second transaction bank shifts the rear totalizer line 121, and the differential for the third transaction bank shifts the front totalizer line 122, in a manner similar to that just described in connection with the first transaction bank, except that the shifting cams for these totalizers, corresponding to the cam 200 of the balance totalizer, are given a helical contour, so as to shift their totalizers, laterally, an increment for each key position. This mechanism is fully described in the United States Patent No. 1,394,256, to F. L. Fuller, and will therefore, not be explained in greater detail.

6. Totalizer control by transaction keys—Totalizer selecting plates

Since this mechanism is well known in the art, as shown by the United States Patent No. 1,619,796 to B. M. Shipley, it will be only briefly described.

Figure 17:
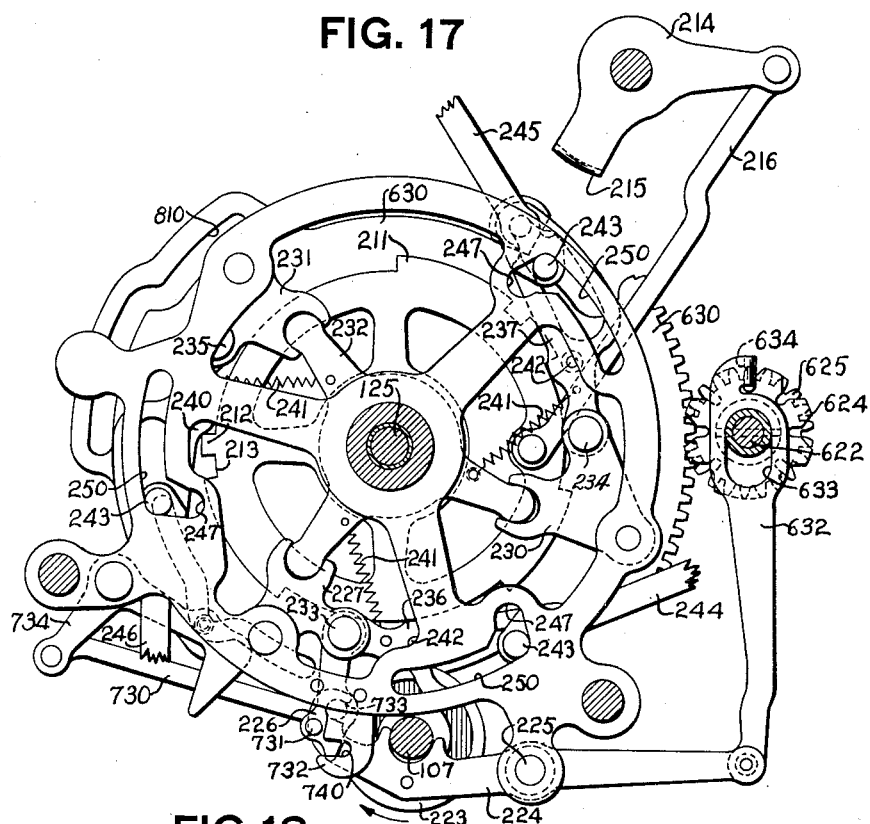
Fig. 17 is a side view of the total plate alining mechanism, and parts of the totalizer engaging mechanism.

There are two selecting plates 210, 211, Figs. 2 and 17, which are adjusted under control of the second and third transaction bank differentials, respectively. These plates are provided with the customary high and low spots 212, 213, which control the engaging of the totalizers, as will be hereinafter explained, and which are cut in a pattern designed to engage the three totalizer lines according to the plan already set out under heading 4.

Referring to Fig. 52, when the segment 164 receives an adjustment from the differential in that figure, the bracket 214, Fig. 17, receives a corresponding adjustment, through the segment 164 being connected to the bracket 214 by the yoke 215. Movement of the bracket 214 adjusts the plate 211 correspondingly, through the link 216.

7. Totalizer control by transaction keys—Totalizer engaging mechanism

Figure 14:
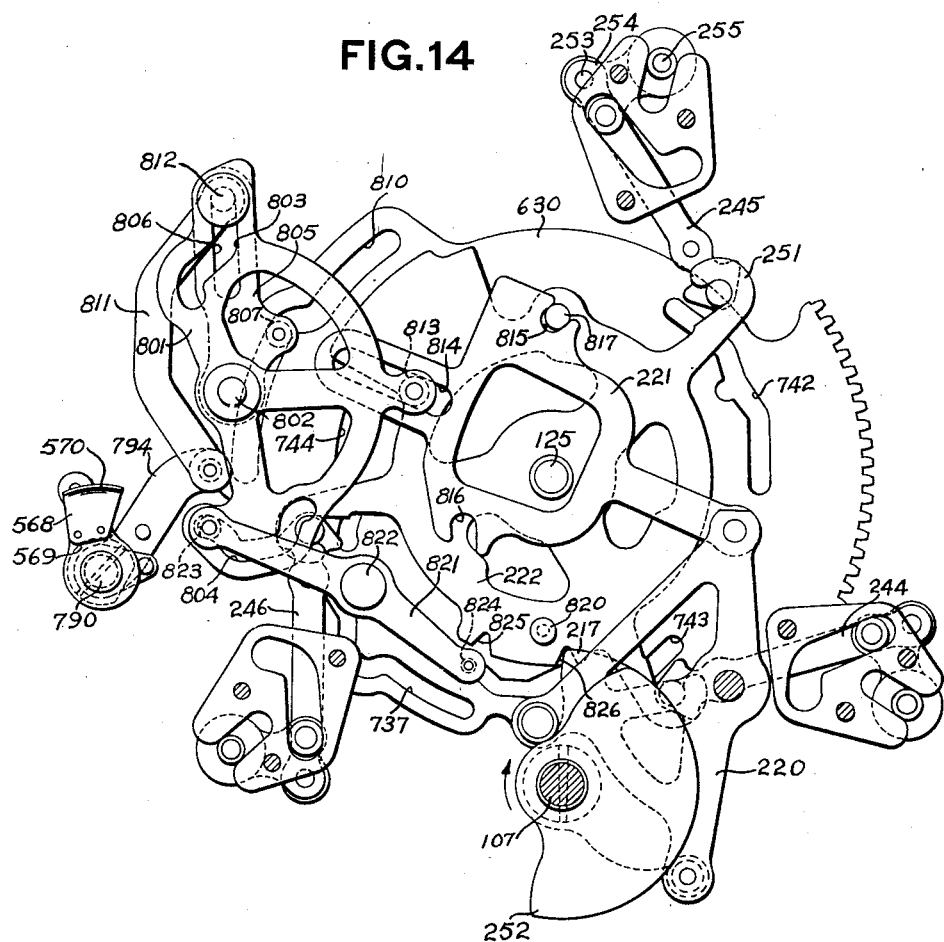
Fig. 14 is a side view of the totalizer engaging mechanism and the total plate in partially operated position.
Figure 19:
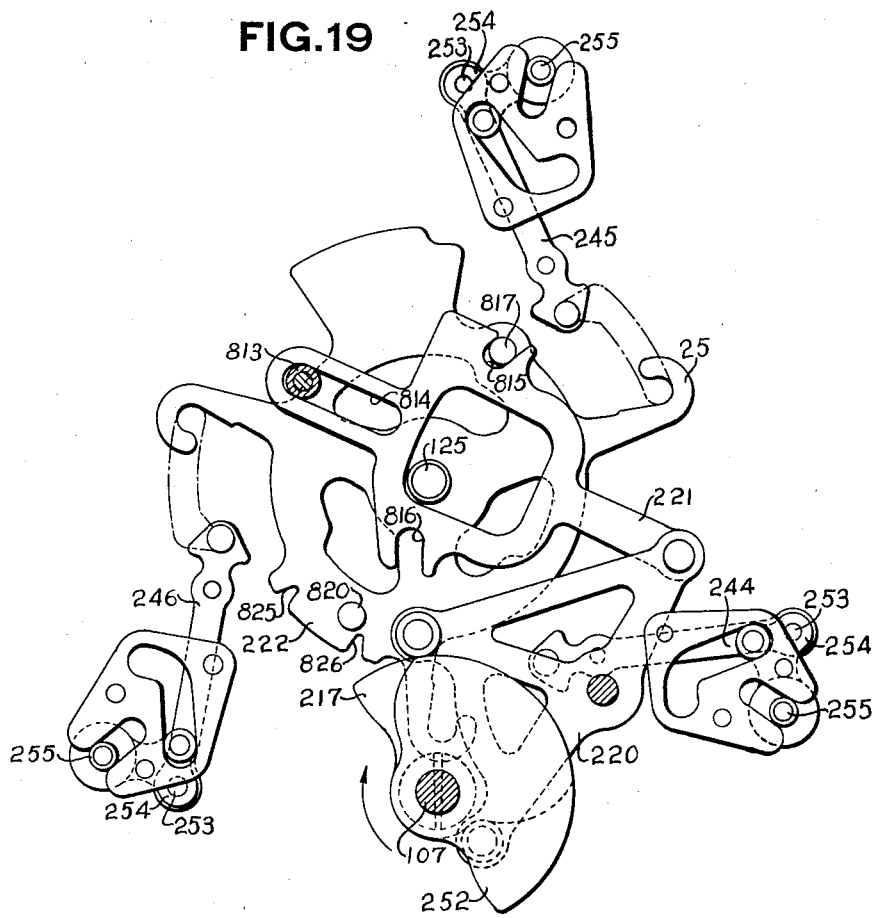
Fig. 19 is a side elevation of the totalizer engaging mechanism in home position.

This mechanism, Figs. 14, 17 and 19, is well known in the art, as shown by United States Patent No. 1,619,796 to B. M. Shipley, and operates, in this machine, in the same manner as in that disclosed by the patent, except in the following two particulars.

First, the pattern of the plates 210 and 211, is changed, which alters the plan of engagement for the totalizer lines, but which does not change the general operation of the engaging mechanism.

Figure 60:
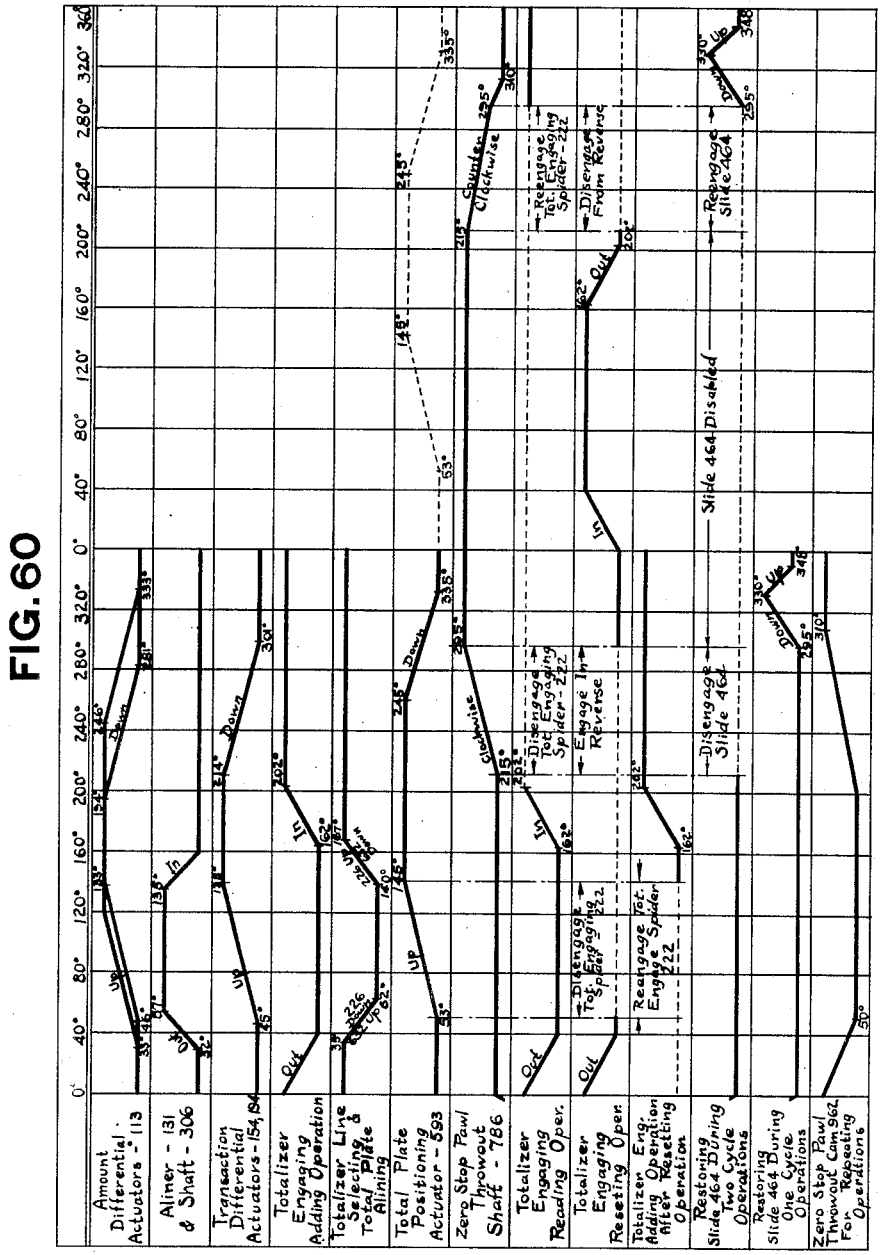
Fig. 60 is a chart showing the timing of many of the principal mechanisms in the machine.

Second, the timing of this mechanism is such that any totalizers which are engaged during an operation remain engaged at the end of that operation, and are disengaged at the very beginning of the succeeding operation; see Fig. 60, Fig. 19 shows the condition of parts of this mechanism at the end of an operation in which the front totalizer line 122 was engaged.

This mechanism will now be briefly described. Referring to Figs. 14, 17 and 19, when the drive shaft 107 begins its rotation, the cam 217 rotates the bell-crank 220 counter-clockwise, moving the link 221 to the left and rotating the spider 222 counter-clockwise, from the position shown in Fig. 19, to that shown in Fig. 14. When the spider reaches this latter position, the cam 223, Fig. 17, rotates the lever 224 counter-clockwise, about its pivot 225. This moves the link 226 downward rotating the bell-crank 227 clockwise. This clockwise movement of the bell-crank 227 is transmitted to the bell-cranks 230 and 231 through the medium of the three armed lever 232. The clockwise movement of the three bell-cranks 227, 230 and 231 moves the pivot points 233, 234 and 235 of the levers 236, 237 and 240 away from the plate 211, tensioning the springs 241, moving the studs 242 away from the plate 211, moving the studs 243 on the ends of the links 244, 245 and 246 into the recesses 247 of the slots 250, if such studs are not already there, and allowing the plate 211 to be adjusted when the movement is completed.

After the plate 211 is adjusted, the cam 223 rotates the lever 224, clockwise, to its former position; see Fig. 60. This moves the link 226 upward, rotates the bell-cranks 227, 230 and 231 counter-clockwise and the three armed lever 232 clockwise, to their former positions. The movement of the bell-cranks 227, 230 and 231 moves the pivots 233, 234 and 235 toward the plate 211, and along with them the studs 242. Where high spots such as 212 are located opposite the studs 242, the studs are held against movement, and form fulcrums for the levers 236, 237 and 240, the outer ends of which move the studs 243 of the links 244, 245 and 246 into engagement with the hooks 251 on the spider 222. Where low spots such as 213 are located opposite the studs 242, the studs are moved into the depressions and fail to engage the studs 243 with their hooks 251.

When the levers 236, 237 and 240 have completed their movement just described, the cam 252, Figs. 14 and 19, rotates the bell-crank 220 and the spider 222, clockwise, pulling with them any of the links 244, 245 and 246 which are engaged with the hooks 251. The opposite ends of these links are pivoted at 253 to the arms 254 fastened to the shafts 255, and pull these shafts toward the differential racks—114, Fig. 55, at the same time rotating them sufficiently to remove the aliner 256 from its engaged position, by the action of the cam 257. The totalizers 120, 121 and 122, being mounted on the same brackets 260 as the shafts 255, are moved into engagement with their racks 114, Figs. 49 and 55.

The totalizers 120, 121 and 122 remain engaged with their racks 114 until the beginning of the next operation, as explained above, at which time they are disengaged by a counter-clockwise movement of the spider 222.

8. Totalizer control by transaction keys—Shifting of balance totalizer under control of the keys in the second and third transaction banks Referring to Figs. 2, 39, 41, 43, 44, 45, 46 and 49, when one of the keys 134, 135, 137, or 140 is depressed, and the machine then released for an adding or subtracting operation, the balance totalizer will be shifted to its adding or subtracting side, as determined by the key depressed.

Figure 41:
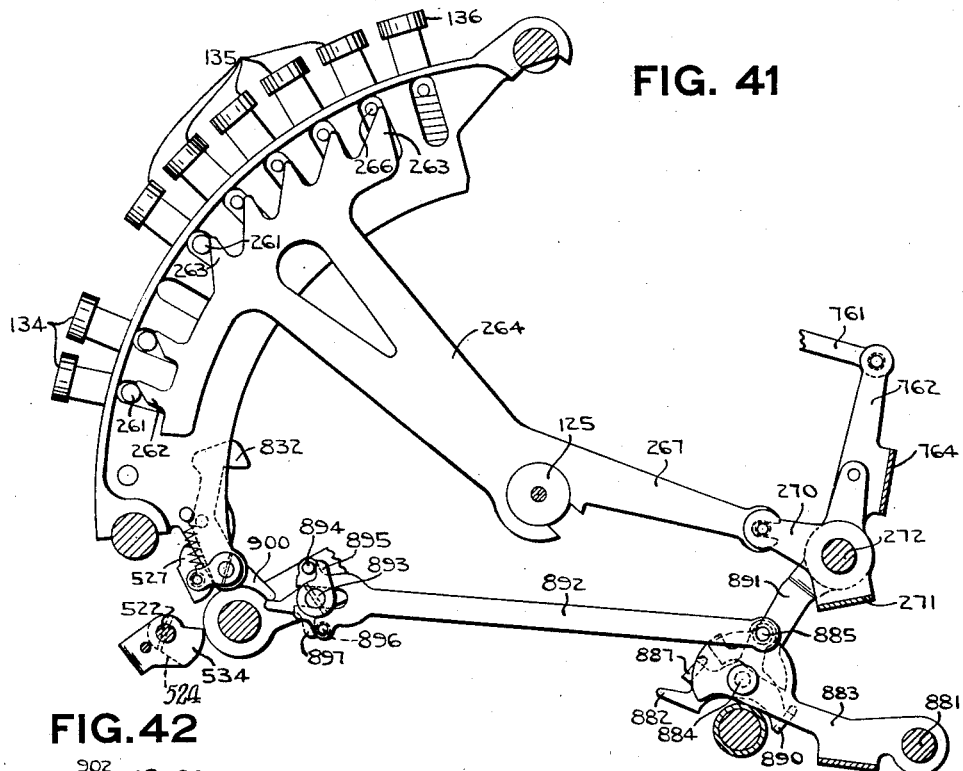
Fig. 41 is a side elevation of the second, or middle transaction key bank as seen in Figs. 1 and 2, and also of parts of the key controlled and automatic totalizer selecting mechanisms.
Figure 44:
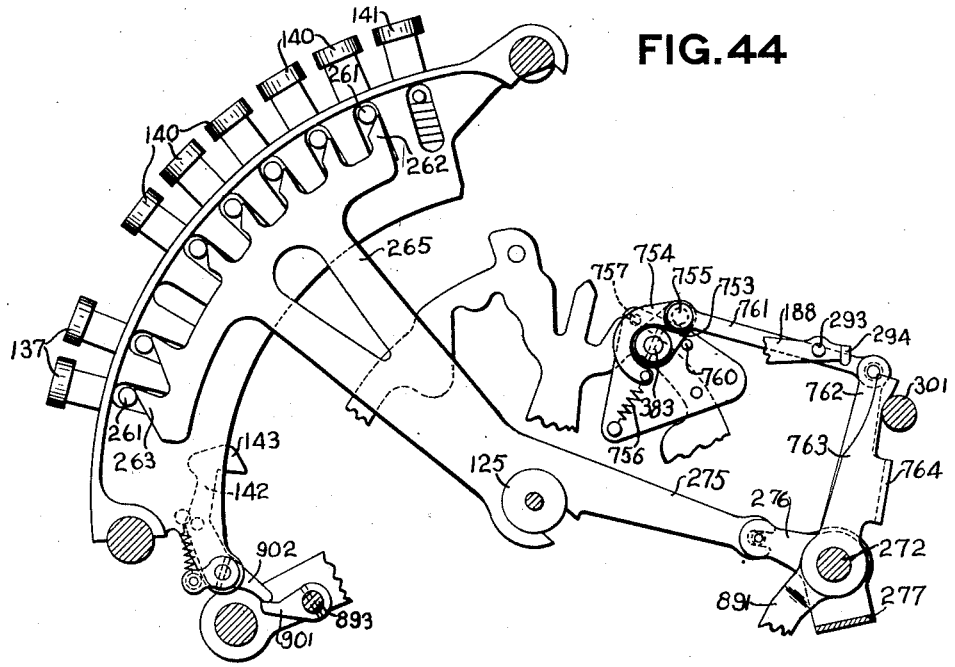
Fig. 44 is a side elevation of the third, or left hand transaction key bank as seen in Figs. 1 and 2, and also of parts not shown in Fig. 41, of the key controlled and automatic totalizer selecting mechanisms.

The keys 134, the "Total checks" key of the keys 135, and the keys 137 and 140 are provided with long studs 261, Figs. 41 and 44, which overlie the teeth 262 and 263 on the segments 264 and 265. The keys 135, other than the "Total checks" key have only the customary short studs 266, which do not overlie the teeth on the segments, and have no control over them.

The segment 264 is pivoted on the rod 125 and has a rearwardly extending arm 267 coupled to the arm 270 of the yoke 271 pivoted on the shaft 272. On its other end, Fig. 45, the yoke 271 has an upwardly extending finger 273, having a flat top, and a step 274 extending from its front edge a short distance below the top.

The segment 265, Fig. 44 also is pivoted on the rod 125 and has a rearwardly extending arm 275 coupled to the arm 276 of the yoke 277 pivoted on the shaft 272. The yoke 277 has an upwardly extending finger 280, Fig. 45, having a flat top which lies at a height midway between the step 274 and the top of the finger 273. The finger 280, unlike the finger 273, has no step on its forward edge.

Figure 45:
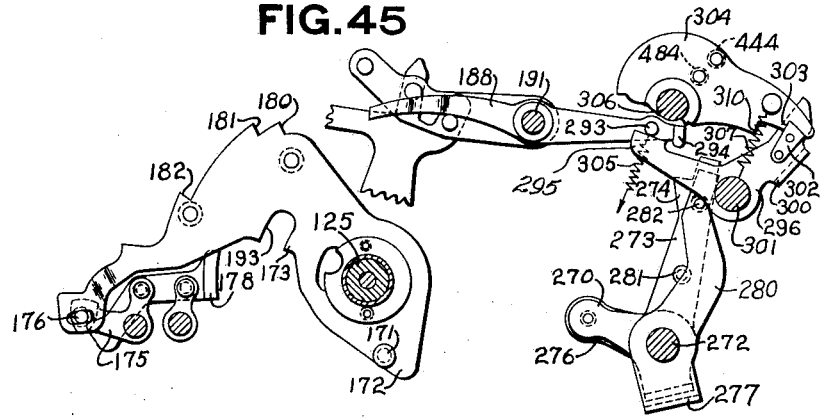
Fig. 45 is a detail view of certain parts of the totalizer selecting mechanism shown in Fig. 39, and not shown in Fig. 43.

Two studs 281 and 282, Figs. 39 and 45, are fastened to the sides of the fingers 273 and 280, and extend across the space between them. A spanning lever 283 is pivoted on the upper end of a lever 284, and rests, at its upper and lower ends against the studs 282 and 281, respectively.

The lever 284 is pivoted on the rod 272 and is coupled, at its lower end, to the lever 285 pivoted to a part of the machine frame at 286. A nose 287, on the forward end of the lever 285 lies under the arm 290, pinned to the shaft 291. This shaft 291 is journaled in the stationary frame of the key bank and has pinned to its other end, the zero stop pawl 195. A spring 292 is fastened to the lever 284 and to the machine frame, to hold the spinning lever 283 against the studs 281 and 282, and to return the lever 284 to its home position, after it has received a counter-clockwise rotation.

Of the two stop levers 188 and 190, only 188 is used during adding and subtracting operations, lever 190 being used only during total reading and resetting operations.

The lever 188 has, on its rear arm, a stud 293 and an extension 294. The stud rests on the forward arm 295 of the bell crank 296, connected to the bell crank 297 by the yoke 300. These bell cranks are both pivoted on the rod 301.

A block 302 is secured to the bell crank 296, and engages the notch 303 in the latch 304 to hold the rear end of the lever 188 in raised position, against the tension of spring 305. The latch 304 is pivoted on shaft 306 and receives a constant clockwise tension from the spring 307 fastened to the latch and to the rod 301.

When a key 134 is depressed, its stud 261 rotates the segment 264 one step clockwise, due to the camming action of the narrow tooth 262, causing the segment to move the finger 273, Fig. 45, forward one step, where the step 274 lies in the path of the extension 294. This movement of the finger moves the lower end of the lever 283, Fig. 39 forward, rotating the levers 284 and 285, the arm 290, the shaft 291, and the zero stop pawl 195. The rotation of pawl 195 removes it from the path of the arm 173, allowing the latter to be rotated clockwise upon rotation of the drive shaft 107. When the machine is released for an adding or subtracting operation the latch 304 receives a slight counter-clockwise rotation, by mechanism to be later described, releasing the block 302 from the notch 303, and allowing the spring 305 to rotate the bell crank 296 counter-clockwise, and lower the rear end of the lever 188 until the extension 294 rests on the step 274 which was moved into the path of the extension, as explained above.

The movement of the extension 294 into contact with the step 274 raises the front end of the lever 188 to a position lying in the path of the step 182 on the arm 173.

The operation of the machine release mechanism also allows the arm 173 to begin its excursion immediately after the lever 188 is adjusted.

Due to the zero stop pawl 195 (Fig. 39) being previously removed from the path of the arm 173, the latter is free to rotate until the shoulder 182 strikes the lever 188, stopping the arm 173 and the cam 200, Figs. 49 and 51, in the "8" position. This movement of the cam 200 shifts the balance totalizer 120 to its adding position where the wheels 118 will mesh with the differential racks 114 when the totalizer is engaged with these racks by mechanism already described.

After the differential arm 173 is returned to its home position, the bell crank 296, Fig. 39, receives a clockwise movement, sufficient to move the block 302 from the notch 310 to the notch 303, as will be hereinafter more fully described, allowing the spring 307, Fig. 45, to lower the notch 303 over the block 302, to hold the latter, and the bell crank 296, in retracted position, against the tension of spring 305.

When the "Total checks" key 135, Figs. 2 and 41, is depressed, the segment 264 is rotated two steps, due to the action of the wide tooth 263 on the stud 261, rotating the yoke 271 and moving the flat top of the finger 273 under the extension 294. This removes the zero stop pawl 195 from the path of the arm 173, and prevents the spring 305 from rotating the lever 188 when the machine is released, thereby holding the lever in the position where its front end lies in the path of the shoulder 180 of the differential arm 173. When the arm 173 is rotated clockwise, its shoulder 180 strikes the arm 188 and stops the arm in the "3" position, Fig. 51, causing the balance totalizer to be shifted to its subtracting position. At the end of the operation the mechanism is returned to home position in the manner described in reference to the operation with keys 134.

When a key 135, other than the "Total checks" key, is depressed, the segment 264 is not moved, due to the absence, on these keys, of the long studs 261. This prevents the finger 273, the stud 281 and the levers 283, 284 and 285 from removing the zero stop pawl 195, which, being left in the path of the arm 173, stops the movement of the arm in the "0" position, when the machine is operated, and consequently causes the balance totalizer 120 to be shifted to its subtracting position. At the end of the operation the mechanism is returned to home position in the manner described in reference to the operation with keys 134.

When a key 137, Fig. 44 is depressed, the segment 265 is rotated two steps, moving the yoke 277 and the finger 280, Fig. 45, correspondingly. This places the flat top of the finger 280 under the extension 294 and moves the lever 283, Fig. 39, forward, due to its contact with stud 282. As in the above instances, this removes the zero stop pawl 195 from the path of arm 173. When the machine is released for operation, the extension 294 is lowered until it rests on the flat top of the arm 280, and the front end of the lever 188 raised to position where it lies in the path of shoulder 181. The subsequent clockwise movement of the arm 173 causes the shoulder 181 to strike the lever 188, stopping the differential mechanism in the "4" position and causing the totalizer to be shifted to its subtracting position. At the end of the operation the mechanism is returned to home position in the manner described in reference to the operation with keys 134.

When a key 140 is depressed, the segment 265 is rotated one step, moving the yoke 277 and the finger 280 correspondingly. This movement of the finger is not sufficient to place the flat top of the finger under the extension, but is sufficient to withdraw the zero stop pawl 195 by causing a movement of the lever 283. When the machine is released for operation, the extension 294 is allowed to fall until the block 303 comes into contact with the notch 310. This movement raises the front end of lever 188 entirely clear of the shoulders on the arm 173, allowing the arm to rotate until it strikes the stud 196 on the frame member 197. The arm 173 is, in this manner, stopped in the "9" position, causing the balance totalizer to be shifted to its adding position. At the end of the operation the mechanism is returned to home position in the manner described in reference to the operation with keys 134.

9. Transfer mechanism

The transfer mechanism employed to carry the excess digits from one denominational order to the next is old and well known in the art, and since it is fully shown and described in the United States Patent No. 1,230,864 to W. A. Chryst, it will be only briefly described.

Referring to Fig. 55, during an operation of the differential when there is no transfer taking place in this particular bank, when the mechanism begins its return movement the arm 311 of the transfer coupler 312 is in its lower position, with the stud 313 extending into the notch 314 of the bracket 315 mounted rigidly on the rack 114. When the coupler 312 reaches the transfer blocking plate 316, the stud 317 on the coupler 312 strikes the nose 320 of the plate 316, and upon continued movement of the rack 114, a clockwise rotation is imparted to the coupler 312 about its pivot 321. This forces the stud 313 upward, out of the notch 314, allowing the bracket 315 to be rotated to its home position while the coupler 312, and the two-toothed transfer segment 322 to which it is pivoted, are held in their retracted position.

Referring to the totalizer line 120, when the long tooth 323 of their totalizer wheel 118 or 119 in the bank of next lower denomination to that shown in Fig. 55, is rotated from "9" to "0," it strikes the tail 324 of the transfer pawl 325, and rotates the pawl counter-clockwise sufficiently to let the blocking plate 316 rotate clockwise a short distance about its pivot 326. This latter movement swings the nose 320 of the plate 316 out of the path of the stud 317, so that when the rack 114 moves through the last part of its return stroke, the coupler 312 is not rotated by striking the nose 320, but passes over it, and, as a consequence, the stud 313 remains in engagement with the notch 314 of the bracket 315 which pulls the coupler 312 and the segment 322 with it until the two teeth on the segment 322 register an additional unit on the totalizer wheel.

The pawl 325 and the plate 316 are returned to normal position at the end of the upward stroke of the succeeding operation by a member rotating the plate 316 counterclockwise to its former position, allowing the pawl 325 to rotate clockwise to its former position.

10. Automatic overdraft mechanism

The machine is provided with a mechanism designed to add one unit in the penny, or units denominational order of the balance totalizer whenever the wheels in its highest denominational order pass through "0" during a subtracting operation, or during an adding operation subsequent to such a subtracting operation. This mechanism is known in the art as "Overdraft mechanism," and the extra unit as the "Fugitive unit," and will be termed such hereinafter.

Referring to Figs. 1, 46 to 50, 52 and 55, and more particularly to Figs. 1 and 49, it may be seen that the wheels 1180 and 1190 of the highest denominational order have the usual differential mechanism including the rack 114, but have no corresponding bank of keys 100. This limits the use of this order to the function of receiving units transferred from the wheels of the next lower order, which units will never, in the practical use of the machine cause the wheels on this order to pass through zero. In this way, the wheels in the highest denomination are protected against being run from "9" to "0" positively, which limits their passing through "0" to overdrafts as mentioned in the preceding paragraph. This denominational order having no corresponding key bank is known in the art as an "over-flow denomination," and will be termed such hereinafter.

Figure 46:
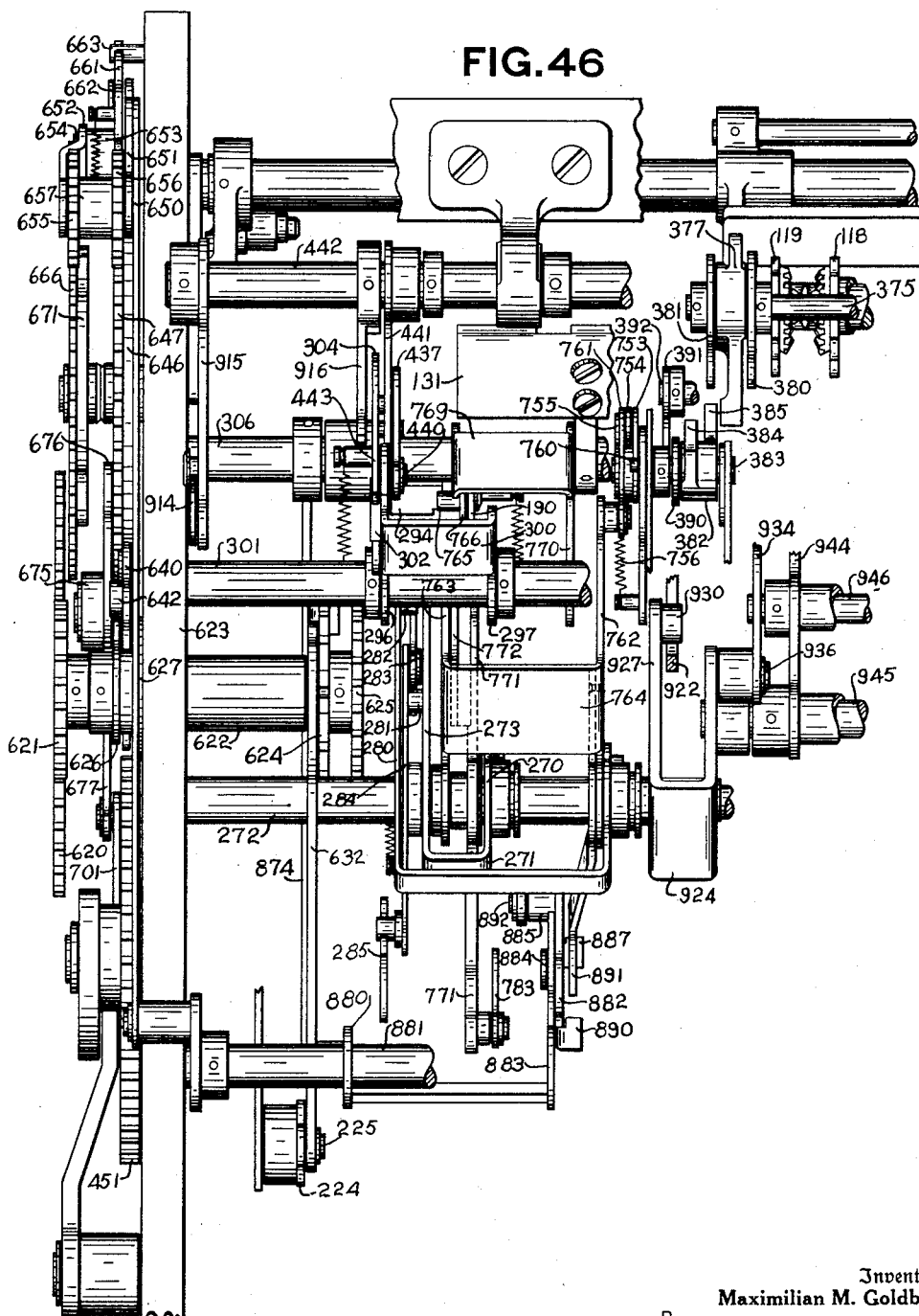
Fig. 46 is a back view of the right end, of the machine, as seen in Fig. 1, showing the mechanism with the cover removed.
Figure 50:
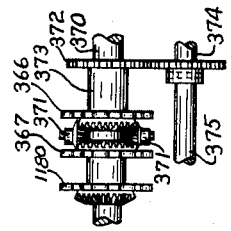
Fig. 50 is a plan view of parts of the overdraft mechanism shown in Fig. 49.

The overdraft transfer pawl 327, Fig. 49, is situated in line with whatever wheel of the over-flow denomination is in line with its rack 114, and cooperates with it in the same manner that the pawl 325, Fig. 55, cooperates with the totalizer wheel with which it is in line. The construction of this pawl is identical to that of the pawl 325, it having a tail 330, Fig. 48, a lower arm 331 and a stud 332 fastened thereon. The stud 332 extends into a recess 333 in the bell crank 334, the recess having a step 335 and a pocket 336. The bell crank 334 is pivoted to the machine frame at 337 and is coupled to another bell crank 340 pivoted to the frame at 341. The two bell cranks 334 and 340 are tensioned clockwise and counterclockwise, respectively, by the spring 342 fastened to each. The bell crank 334 has a nose 343 and a stud 344, the latter normally lying in the path of the ear 345 which depends from the lower edge of the rack 346. The rack 346 is mounted at 347 and 250 for sliding movement, and has the driven lever 351 pivoted to it at 352. The driven lever 351 has a stud 353, at its lower end, lying in the plane of the bell crank 334, and has a link 354 pivoted to it midway of its pivot 352 and the stud 353. The link 354 is pivoted, at its opposite end, to the arm 355 pinned to the shaft 356, which has pinned to other end the arm 357. A cam rod 360 is pivoted, at its upper end to the arm 357, and is bifurcated at its lower end to have a sliding motion on the rod 361. A stud 362 on the cam rod 360 rides in a cam groove 363 in the cam gear 364. A gear 365 meshes with the cam gear 364 and is pinned to the drive shaft 107, from which the mechanism just described receives its movement. Two mutilated gears 366 and 367, Figs. 49 and 50, are loosely mounted on the totalizer shaft 370 and have their movements transmitted to each other through the bevelled gear pinions 371 in a manner similar to the totalizer wheels 118 and 119. The gear 366 lies in the plane of the rack 346 when the totalizer is in its adding position and is engaged with the differential mechanism, to receive whatever motion is imparted to the rack 346. Likewise, the gear 367 lies in the plane of the rack 346 when the totalizer is in its subtracting position, as shown in Fig. 49, and receives whatever motion is imparted to the rack 346. A gear 372 is connected to the gear 366 by the hollow shaft 373 and meshes with the gear 374 pinned to the shaft 375. The shaft 375 is journaled in the shiftable totalizer frame at 376 and 377, and has secured to it the tappets 380 and 381, Figs. 46, 49 and 52. A rocker 382, pinned to a shaft 383 journaled in the machine frame, has two upwardly extending arms 384 and 385 and a forwardly extending arm 386, Fig. 52, having a stud 387 on the end thereof. When the totalizer is in its adding position and is engaged with the differential mechanism, the arm 384, Figs. 46 and 49, lies in the plane of the tappet 380 and in its path, so that if the tappet should be moved one step counter-clockwise, the rocker 382 would be rotated clockwise, to the position shown in Fig. 52. Likewise, if the totalizer is in its subtracting position, as shown in Figs. 46 and 49, the tappet 381 is in the plane of the arm 385, and when the totalizer is engaged, lies in a position to rotate the rocker 382 counter-clockwise if given one step of rotation clockwise. A cam rod 390 is slotted at its rear end to slide on a reduced portion of the rocker 382, and is pivoted at its front end to the arm 391 extending downwardly from the shaft 392, to which it is pinned, and which is journaled in the machine frame. The cam rod 390 has a cam block 393 secured to its side and lying in the plane of the stud 387 and in its path in such a manner that when the rocker is rotated in either direction, the stud will move the block to the rear, rotating the shaft 392 counter-clockwise against the tension of spring 394. An arm 395 depends from the opposite end of the shaft 392, to which it is pinned, and has, on its lower end, a stud 396 extending into the slot in the transfer plate 316, Fig. 55, of the differential mechanism in the units or "pennies" denomination. This plate is identical with the transfer plate 316 shown in Fig. 55, and the arm 395 performs the same functions in respect to it as is performed by the lower arm of the transfer pawl 325.

11. Operation of overdraft mechanism

Assuming the totalizer is standing at positive "1" and the amount 2 is to be subtracted, the totalizer, Fig. 49, will be shifted to its subtracting position, with its wheels 119 in line with the racks 114, and will then be engaged with the racks. The wheel 119 in the units denomination now stands at "8", while the remaining wheels 119 all stand at "9". The wheel 118 of the units denomination now stands at "1", while the remaining wheels 118 stand at "0". When the units rack moves its first step, the units wheel 119 will turn to "9," the wheels 119 then all reading "9." When it moves its second step, the units wheel will turn to "0," tripping the transfer pawl for the tens denomination, which will then have a unit added to its wheel, turning it from "9" to "0," and so on along the entire totalizer until the overflow wheel 1190 trips the overdraft transfer pawl 327. This moves the stud 332, Fig. 48, from under the step 335, allowing the spring 342 to rotate the bell crank 334 clockwise, until the stud 332 rests on the upper edge of the pocket 336. This moves the stud 344 out of the path of the ear 345 and moves the nose 343 in front of the stud 353 to block its movement. The cam slot 363 then raises the cam rod 360 and moves the link 354 to the left. The stud 353 being held against movement to the left, necessitates a movement of the rack 346 to the left, rotating the gear 367 an increment clockwise. This rotates the gear 366 and the gear 372, Fig. 50, counter-clockwise, and the gear 374 and shaft 375 clockwise. This rotates the tappet 381 clockwise, Figs. 46 and 52, and the rocker 382 counter-clockwise, causing the stud 387 to move downward past the cam block 392, while the block moves the cam rod 390 and the stud 396 to the right Fig. 52. This movement of the stud 396 allows the transfer plate 316, Fig. 55, in the units denomination to rotate clockwise, causing the addition of the fugitive unit in that order. The units wheel 119 now reads "1" and the others "0." The adding wheels 118 now read "8" in the units denomination and "9" in all the others.

Figure 47:
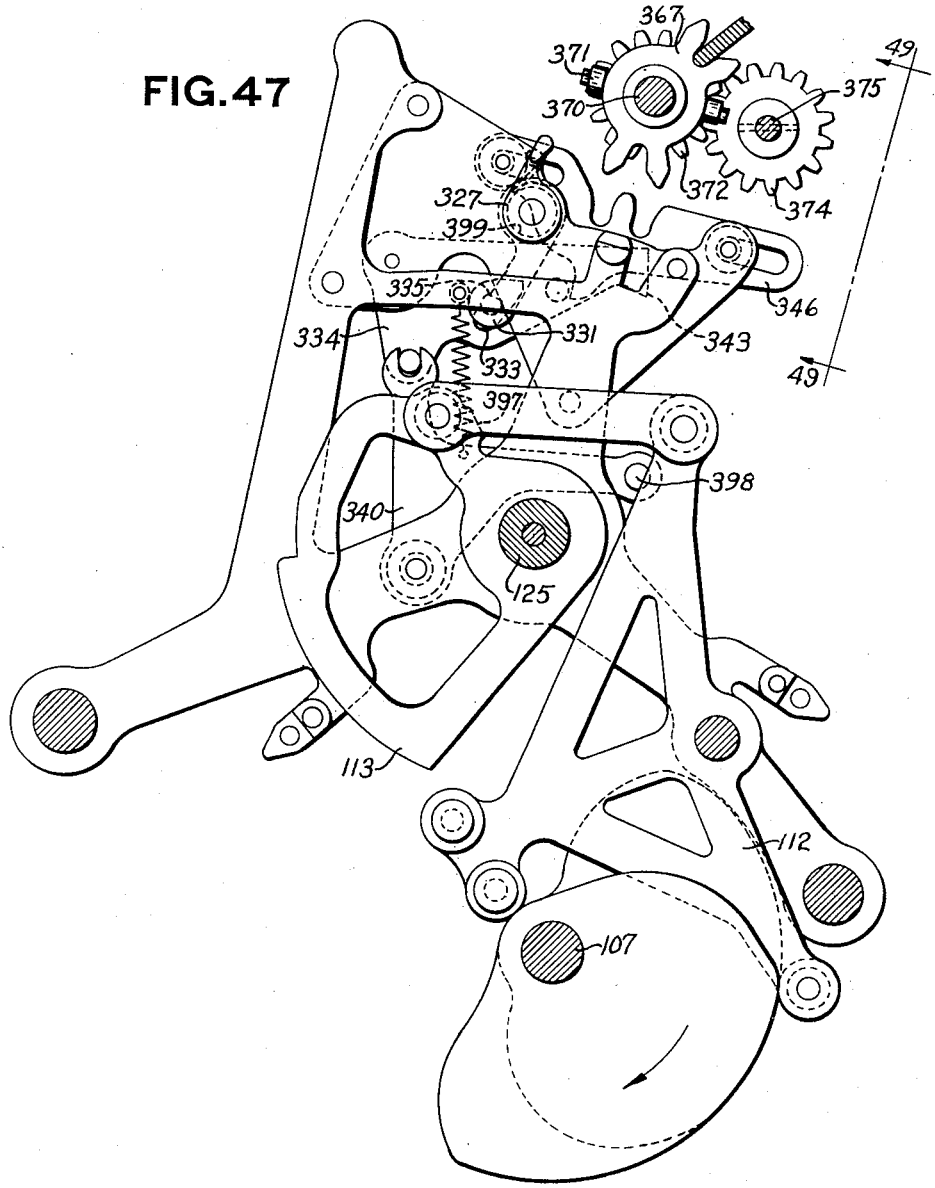
Fig. 47 is a side elevation of parts of the overdraft mechanism, showing their cooperation with the differential mechanism of the amount key bank of highest denominational order.
Figure 48:
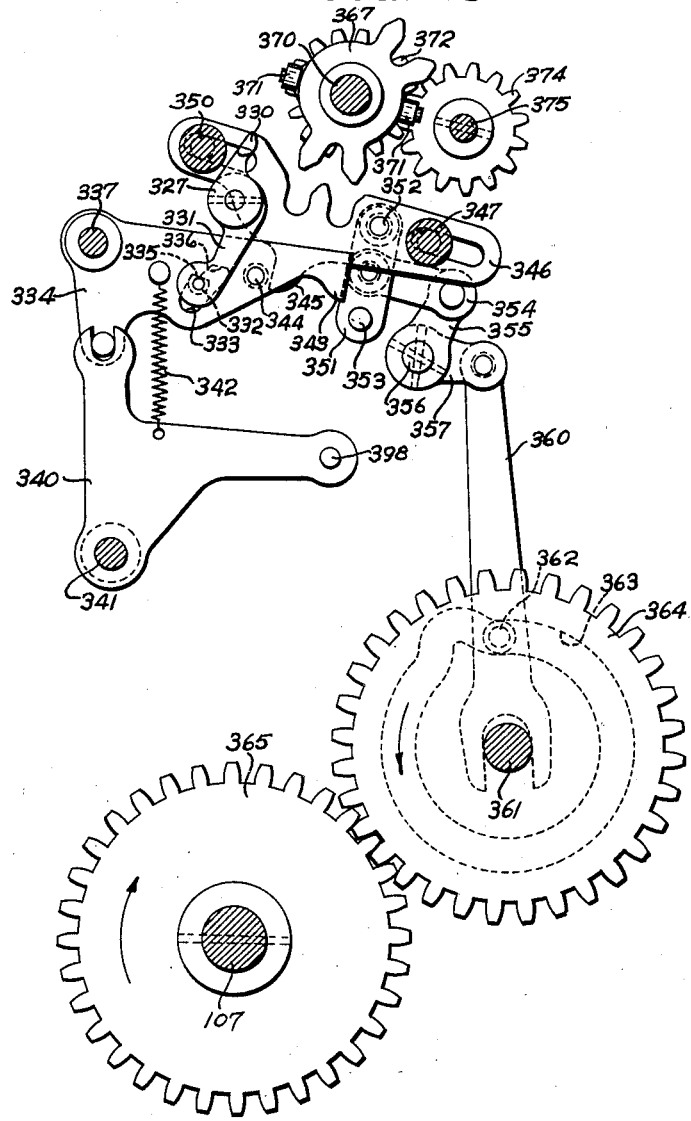
Fig. 48 is a side elevation of a portion of the overdraft mechanism partly shown in Fig. 47 showing its connection to the machine drive.

If now the amount "2" is to be added into the totalizer, it will be shifted to its adding position during the clockwise movement of the actuators 194, Fig. 39, and 113, Fig. 47. When the actuator 113 nears the end of this movement, its shoulder 397 strikes the stud 398 on the bell crank 340, pressing it downward and rotating the bell crank 334 counter-clockwise against the action of spring 342. This allows the transfer pawl 327 to return, by the tension of its spring 399, to its former position on the step 335 of the recess 333, and moves the nose 343 out of the path of the stud 353 so that until the pawl 327 is again tripped, the overdraft mechanism will not be operated. The wheels 118 are now brought into engagement with the racks 114 which begin their return movement. The entering of the first unit will turn the units wheel to "9", the wheels 118 then all reading "9", as in the case of the wheels 119 in the above example. The entering of the second unit causes all the wheels to be turned to "0", and all the transfer pawls to be tripped, the pawl 327 again releasing the bell-crank 334. This time, however, the rack 346 is engaged with the gear 366, which, when rotated clockwise by the gear, rotates the gear 374, the shaft 375 and the tappet 380 counter-clockwise. The tappet 380, now lying in the plane of the arm 384, rotates the rocker clockwise. As in the former example, the cam rod 390 and the stud 396 are moved to the right, releasing the transfer plate 316 in the units denomination and causing the addition of the fugitive unit in that order.

12. Machine release mechanism for adding and subtracting operations

For adding and subtracting operations, the machine is released by the depression of any of the transaction keys 134, 135, 137 and 140, Fig. 2, and the motor bar 400.

Referring to Figs. 28 and 30 to 32, when a key 135, Fig. 30, is depressed, its stud 266 moves the cam plate 402 to the left, swinging the arm 403 clockwise, about its pivot on the rod 404. The roller 405 on the ear 406 of the arm 403 then rotates the bell-crank 407 and the arm 410 of the yoked block 411, Figs. 28 and 30. This swings the nose 412, Figs. 28 and 31, of the yoked block 411 out of the path of the stud 413 on the bracket 414, against the tension of the return spring 415.

Referring to Figs. 28 and 34 to 36, when the motor bar 400 is depressed, it swings the lever 416 about its pivot 417, the stud 420 swinging the lever 421 counter-clockwise. This swings, clockwise, the arms 422 and 423, connected by the yoke 424 and pivoted on the release shaft 425. The arm 423, Fig. 35, swings the block 426 counter-clockwise, removing its nose 427 from the path of the stud 413, Figs. 28 and 36, against the tension of the return spring 428, connected to the block 426 by the yoke 429 and the arm 430.

The removing of the two blocks 411 and 426 from the path of the stud 413, allows the bracket 414 and the release shaft 425 to be rotated clockwise, by a spring device to be later described, causing a closing of a motor switch and a clutch to start the machine in the manner fully shown and described in the United States Patent No. 1,619,796 to B. M. Shipley. The pawl 431 fully shown and described in the Shipley patent just mentioned is provided to prevent repeat operations of the machine by the operator holding the keys in depressed position.

Figure 21:
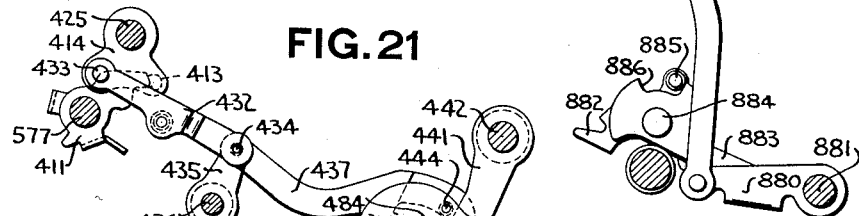
Fig. 21 is a detail side elevation of one of the controls of the key controlled totalizer selecting mechanism.

Referring to Fig. 21, link 432 is pivoted at 433 to the bracket 414 and at 434 to the arm 435 pivoted on the shaft 436. A bar 437 is pivoted at 434 and at 440 to the arm 441 extending downwardly from the shaft 442 on which it is pivoted. The tail 443 of the bell crank 296 and the stud 444 secured to the side of the latch 304 lie in the path of the arm 441, and are moved by the arm, as will be hereinafter explained.

When the shaft 425 is moved clockwise to release the machine, the link 432 and the bar 437 are moved to the left and the arm 441 is swung clockwise. The arm 441 strikes the stud 444, rotating the latch 304 and causing the block 302 to move from the notch 303 to the notch 310. This allows the differential mechanism in the first transaction bank to carry out its functions already explained.

13. Driving mechanism

The machine can be driven either by a motor or by hand. The clutch, motor, switch, and other parts necessary to the motor driving mechanism are fully shown and described in the United States Patents Nos. 1,144,418 to C. F. Kettering and W. A. Chryst, and 1,619,796 to B. M. Shipley, the latter of which shows the mechanism employed to start the operation of the motor drive when the release shaft such as 425, Figs. 3, 28, 31 and 37 is rotated. Also shown in the latter patent is the gear train transmitting the driving motion from the clutch to the drive shaft such as shaft 107, Figs. 3, 14, 17, 39, 55 and 57.

Figure 3:
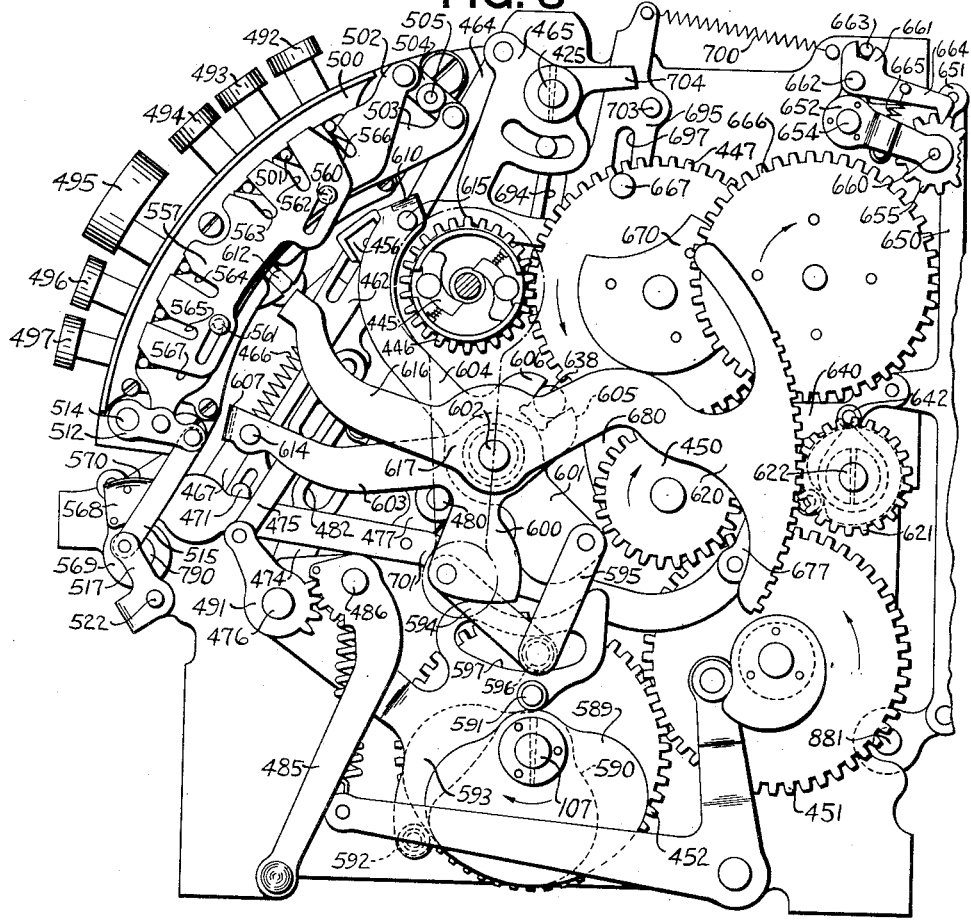
Fig. 3 is a side elevation of the mechanism for positioning the total plate, under the control of the total keys.
Figure 4:
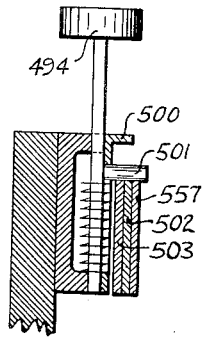
Fig. 4 is a sectional front elevation of a total key and its associated inter-locking plates.

To drive the machine by hand, a crank shown in outline in Fig. 3 is employed. This crank drives the machine through a ratchet mechanism 445 secured to the gear 446, the crank and ratchet mechanism being similar to that fully shown and described in the United States Patent No. 1,761,542, to B. M. Shipley. The gear 446 transmits its motion through the gears 447, 450, 451 and 452, to the drive shaft 107 which operates the machine.

14. Restoring mechanism for adding and subtracting operations—Restoring of machine release Referring to Figs. 3 and 8 the gear 447, which is driven during every operation of the machine, either by the gear 446 or the drive shaft 107, has a groove 453 with a cam surface at 454. A roller 455 rides in the groove and is mounted on the rear arm of the lever 456 pivoted at 457. A stud 460 is secured in the forward arm of the lever 456, protrudes through the slot 461 in the upper end of the coupler 462, and extends over the ear 463 of the slide 464. A lever 465, is pivoted to the upper end of the slide 464 and is pinned on the shaft 425. A spring 466 is fastened at its ends to its couplers 462 and 467, the latter of which is pivoted to the lower end of the slide 464, and exerts on the slide a constant force upward. The coupler 462 has a downwardly extending arm 470 with a bifurcation, at its lower end, extending around the stud 471 in the slide 464, and acts as a guide for the coupler 462 and spring 466. A stud 472, fixed to the ear 473 extending from the back edge of the slide 464 protrudes through slots in the guide plate 474 and the link 475, and serves as a guide for the lower end of the slide 464. The guide plate 474 is pivoted on the stud 476 and has its swinging movement controlled by the movement of the lever 477, pivoted at 480 and having a roller 481 lying within the slot 482 in the guide plate 474.

Figure 8:
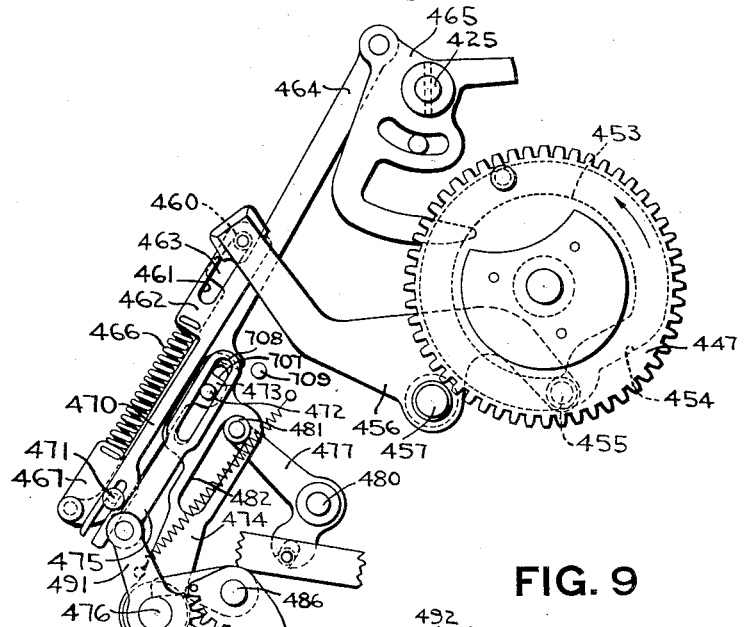
Fig. 8 is a side elevation of both the automatic and the manual restoring devices for the machine release mechanism.

When a transaction key and the motor bar 400 are depressed, removing the blocks 411 and 426, Figs. 31 and 36, from the path of the stud 413, the spring 466, Fig. 8, being held stationary at its upper end, lifts the slide 464, rotating the lever 465 and the shaft 425 clockwise. This rotation of the shaft 425 releases the machine for operation in the manner fully shown and described in the United States Patent No. 1,619,796 to B. M. Shipley.

Near the end of the operation, the cam surface 454 raises the roller 455, lowering the stud 460 and pulling, downward, the slide 464 by the contact of its ear 463 with the stud 460, the lower end of the slide being guided by the stud 472 riding in its slot in the guide plate 474. This rotates the shaft 425, counter-clockwise, a distance considerably greater than is received on its clockwise rotation, allowing the return springs 415 and 428, Figs. 31, 32, 35 and 36 to return their respective blocks 411 and 426 to their former positions, with their noses 412 and 427 in the path of the stud 413.

As the cam surface 454, Fig. 8, moves past the roller 455, the slide 464 is allowed to move upward, by the tension of the spring 466, until the stud 413 comes to rest in the position shown in Figs. 31, 32 and 36.

15. Restoring mechanism for adding and subtracting operations—restoring of parts of balance totalizer shift control The counter-clockwise rotation of the shaft 425, Fig. 21, moves the link 432 and the bar 437 to the right, and swings the lower end of the arm 441 sufficiently to rotate the bell-crank 296 clockwise, by contact with its nose 443, from its position where the block 302 rests in the notch 310, to that shown in Fig. 21. When the bell-crank has been rotated to this extent, the shoulder 483 on the bar 437 strikes the stud 484 on the latch 304 and rotates the latch clockwise, by this positive movement, to lower the notch 303 over the block 302 if for some reason it had not already been lowered by the tension of the spring 307.

16. Restoring mechanism—automatic key release and disconnecting and stopping of motor The counter-clockwise rotation of the shaft 425, Figs. 8, 52 and 55, returns the depressed amount and transaction keys to their former positions, disconnects the motor from the machine drive and breaks the motor circuit in the manner fully shown and described in the United States Patents Nos. 1,144,418, to C. F. Kettering and W. A. Chryst and 1,619,796 to B. M. Shipley.

17. Restoring mechanism—manual key release

Referring to Fig. 8, the handle 485 is pivoted at 486 and has a segment 487 meshing with the segment 490 of the lever 491 pivoted on the stud 476. The link 475, having the stud 473 projecting into the slot in its upper end, is pivoted at its lower end to the lever 491.

When it is desired to release any key erroneously depressed, and before the machine is released, the handle 485 is rotated clockwise, pulling the link 475 and the slide 464 downward, and rotating, counter-clockwise, the shaft 425. This releases all the depressed keys in the manner fully shown and described in the United States Patent No. 1,619,796 to B. M. Shipley.

18. Adding operation

Presuming, while making out a statement, a deposit of $25 is to be entered. The amount is set up on the amount keys 100, Figs. 2 and 55. The "Deposit" key 140, Figs. 2 and 52, is next depressed, moving the finger 280, Fig. 39, one step, removing the zero stop pawl 195 and making it possible for the stop lever 188 to rotate its fullest extent.

The motor bar 400, Figs. 2 and 34, is then depressed, releasing the machine for operation by allowing the shaft 425, Figs. 8 and 21, and the bell-crank 296 to be rotated, as explained under heading 12. The drive shaft 107, Figs. 3, 10, 14, 17, 19, 39, 47, 48, 52, 55, 57 and 58, then begins to rotate, first disengaging any totalizers engaged during the previous operation, Fig. 60, as explained under heading "7."

Figure 58:
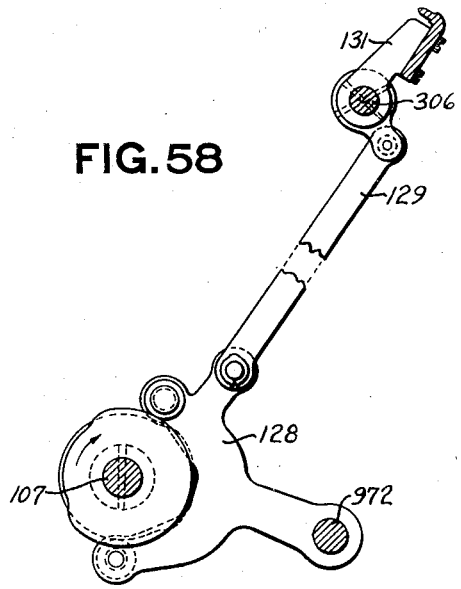
Fig. 58 is a side elevation showing the mechanism for operating an aliner shown in Fig. 55.

The differentials in the amount and transaction banks then start their upward stroke and the aliner 131 Figs. 52, 55, and 58 rocks out of engagement with its segments 130 and 164, as explained under headings 1 and 3. When the differentials start their movement, the levers 236, 237 and 240, Fig. 17, are moved away from the totalizer selecting plates 210 and 211 as explained under heading 7, to permit them to be rotated by the transaction differential as explained under heading 6. The upward movement of the transaction differential also shifts the totalizer lines laterally, as explained under heading 5, the "balance," or upper totalizer being shifted to its adding side, by the differential arm 173 being free to move up to the "9" position, as explained under heading 8. When the differential reaches the end of its upward movement, the aliner 131 is moved into engagement with its segments 130 and 164, as explained under heading 1, and the levers 236, 237 and 240 are moved into engagement with the plates 210 and 211 to select the totalizer lines to be engaged during the operation, as explained under heading 7. Referring to Fig. 2, it will be seen that for this operation, all three totalizer lines will be engaged with the differential racks, to add the number into the "Balance" totalizer, the individual totalizer for the "Deposit" transaction key, and the grand totalizer for the third transaction bank. As soon as the levers 236, 237 and 240 complete their movement, the totalizers move into engagement with their differential racks, as explained under heading 7. The differential is then returned to its home position, the racks 114 rotating the totalizer wheels to enter the amount $25 thereon. When this return movement is nearly completed, the restoring cam 454, Fig. 8 becomes effective, restoring the machine to its former condition and bringing it to a stop, as explained under headings 14 to 16.

19. Subtracting operation

When an amount is set up on the keys 100 and one of the subtracting keys 135 or 137 is depressed, the operation of the machine, upon depression of the motor bar, will be identical to the adding operation just described, except that the "Balance" totalizer will be shifted to its subtracting side and the number run thereon, as explained under headings 5 and 8.

TOTAL READING AND RESETTING

20. Reading and resetting operations—in general

Reading and resetting operations are performed by the same driving mechanism used in adding and subtracting operations, which is released for operation either by the depression of one of the transaction keys and one of the total keys 492—497, Fig. 2, or by the depression of one of the total keys alone.

The total of the amounts entered by any transaction key in the third bank is read by depression of that transaction key and the total key 492, and is reset by depression of that transaction key and the total key 497.

The total of the amounts entered by any transaction key in the second bank is read by depression of that transaction key and the total key 493, and is reset by depression of that transaction key and the total key 496.

The total of the amounts entered by all the keys 140 is registered on the "grand" totalizer for the third bank, situated in the "0" position of the second bank. This amount is read by depression of the total key 493 alone, and is reset by depression of the key 496. The total of the amounts entered by all the keys 135 is registered on the "grand" totalizer for the second bank, situated in the "0" position in the third bank. This amount is read by depression of the total key 492 alone, and is reset by depression of the key 497. This method of obtaining the grand total of the amounts in one bank by a totalizer in the zero position of another bank is well known, as shown in the United States Patent No. 1,761,542 to B. M. Shipley, and will therefore not be further described here.

The amount registered on the "balance" totalizer is read by depression of the key 494 and is reset by depression of the key 495. For all reading and resetting operations, it is necessary for the machine to operate through two complete cycles, in a manner similar to that employed in the patents to Chryst, Fuller and Shipley referred to above.

21. Total keys and their interlocks with each other and with the transaction keys Referring to Figs. 3, 5, 6, 7, 9, 39, 41, and 52, the total keys 492—497 are slidably mounted in a frame 500, Fig. 3, and have pins 501 extending from their sides and overlying slots in the locking plates 502 and 503. A bar 504 is pivoted, at its ends to the plates 502 and 503, and near its middle to the stud 505 on the end of the arm 506, Fig. 9. A shaft 507 is journaled in the machine frame and has pinned to it the arm 506 and the cam lever 510. A spring 511 is fastened to the stud 505 and to the machine, and holds the parts in their upper position shown in Figs. 3, 5, 6, 7 and 9. The locking plates 502 and 503 are pivoted, at their lower ends, to the middle of the levers 512 and 513, pivoted on the rod 514. Links 515 and 516 are pivoted on the outer ends of the levers 512 and 513 respectively, and also to the arm 517 extending from the yoked bracket 520 and the arm 521 pinned to the shaft 522 respectively. The shaft 522 is journaled in the machine frame and has three ears 523, 524 and 525 secured to it in the planes of the blocking pawls 526, 527, and 530, respectively, Fig. 7. The yoked bracket 520 is pivoted on the shaft 522 and has fastened to it the yoked brackets 531 and 532 secured to each other and likewise pivoted on the shaft 522. Ears 533, 534 and 535 extend from the brackets 520 and 532, and lie in the planes of the blocking pawls 526, 527 and 530 respectively, and adjacent the ears 523, 524 and 525. The blocking pawls 526, 527 and 530 are widened as shown at 526', 527' and 530' (Fig. 7) to coact with both sets of ears.

The plates 502 and 503 are each provided with six slots 540 to 545 and 550 to 555, the slots 542, 543, 550 and 555 each moving their respective plates three increments when a stud 501 is moved into them. The slots 541, 544, 551 and 554 each move their respective plates two increments and the slots 540, 545, 552, and 553 each move their respective plates one increment. From this it is seen that for any total key depressed, the sum of the movements of the two plates 502 and 503 will be four increments, thus producing a uniform movement of two increments on the stud 505.

Figure 7:
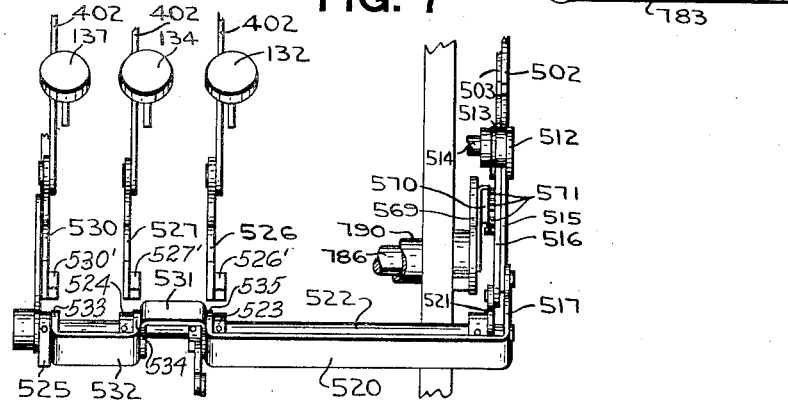
Fig. 7 is a front elevation of the connection between the inter-lock slides and the transaction keys.

Referring to Figs. 7, 30, and 52, each of the three transaction banks has a cam plate 402 pivoted at its lower end to one of the blocking pawls 526, 527, 530, pivoted on stud 556 in their respective banks. When a transaction key is depressed, its stud 266 presses the respective plate 402 downward, moving the corresponding pawl 526, 527 or 530 into the path of two of the ears 523, 535; 524, 534; or 525, 533 respectively. This prevents the depression of the total keys for the transaction banks other than the one in which the transaction key was depressed, as will now be explained.

Figures 7A, 7B, 7C:
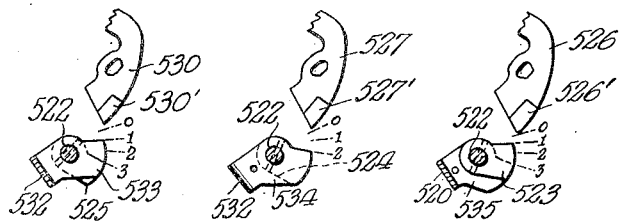
Figs. 7a to 7c are details of parts of the inter-lock mechanism.

In the machine as illustrated there are no keys in the first transaction bank adapted to move the cam plate 402 in that bank, Fig. 39, since the plate is cut away from the path of the studs 266 on the keys 132 and 133, but since it is optional whether or not other keys, which will move the plate 402, are placed in this bank, the interlocks will be described as though one or more of those keys were present. When such a key in the first bank is depressed, the pawl 526 moves into the paths of the ears 523 and 535 (Fig. 7c). When one of the total keys 494 or 495 for the first bank is then depressed, the ear 523 is moved one step upward and the ear 535 is moved three steps upward, where they lie adjacent the pawl 526, neither ear being blocked by the pawl in this movement. However, should an attempt be made to depress any other total key except a key 494 or 495, the plate 503 would be restricted in its movement farther than one step due to the ear 523 bearing against the pawl 526, and the key could, therefore, not be fully depressed, which is necessary to release the machine.

When a key in the second transaction bank is depressed, the pawl 527 moves into the paths of the ears 524 and 534 (Fig. 7b). When one of the total keys 493 or 496 for the second bank is then depressed the ears 524 and 534 are both moved upward two steps, where they lie adjacent the pawl 527, neither being blocked by the pawl in this movement. However, should an attempt be made to depress either total key 494 or 495 for the first bank, its complete depression would be blocked by plate 502, which must be moved three steps before such a depression can be made. Likewise, should an attempt be made to depress either total key 492 or 497 for the third bank, its complete depression would be blocked by plate 503, which must be moved three steps before such a depression can be made.

When a key in the third transaction bank is depressed, the pawl 530 moves into the paths of the ears 525 and 533 (Fig. 7a). When one of the total keys 492 or 497 for the third bank is then depressed, the ear 533 is moved one step upward and the ear 525 is moved three steps upward, where they lie adjacent the pawl 530, neither being blocked by the pawl in this movement. However, should an attempt be made to depress any other total key, the plate 502 would be restricted in its movement farther than one step, due to the ear 533 bearing against the pawl 530, and the key could therefore not be fully depressed.

When any total key is depressed, the upper surface of the plates 502 and 503 is moved under the studs 501 on the remaining keys, preventing a depression of any of them prior to the return of the depressed key to its normal position. The simultaneous depression of two total keys representing different banks is prevented by the plates 502 and 503, because of the different distances these plates must be moved before the keys can be fully depressed.

To prevent the simultaneous depression of both total keys for any one bank, a slide 557, Fig. 3, is provided. This slide is mounted for sliding movement on the headed studs 560 and 561, extending from the side of plate 502. The plate has four slots the edges 562, 563, 564, and 565 of which together with the upper and lower ends 566 and 567, form surfaces contacting with the studs 501, which extend into the plane of the plate. The plate and slots are cut in such a manner that the distance between the surfaces 563 and 564 is greater than the distance between the studs 501 on the keys 494 and 495 for the first transaction bank, and so on for the keys 493 and 496 for the second bank, and for the keys 492 and 497 for the third bank. Thus when one of the keys, for instance key 496, is depressed, the plate 557 is moved upward so that the slot for the pin 501 on the key 493 is moved out of alinement with the pin, and the key cannot be depressed until the key 496 has returned to normal position.

The total keys are restored to normal position by the caming action of the slots in the plates 502 and 503, the spring 511 exerting a constant force upward on these plates. To prevent the restoration of these keys before the end of an operation, a bracket 568, Figs. 6 and 7, secured to the arm 569 and having a flange 570 is provided to cooperate with studs 571 extending from the side of the link 516. As soon as a total key is fully depressed, the arm 569 is swung clockwise a distance sufficient to move the flange 570 over one of the studs 571, holding the slide 503 and the depressed key from return movement. The arm 569 is returned to its former position at the end of the operation, allowing the spring 511 to return the depressed total key the plates 502 and 503, and the associated parts. The mechanism controlling the movement of the arm 569 will be described later.

22. Machine release mechanism for total reading and resetting operations

The machine is released for total reading and resetting operations either by the depression of one of the total keys alone, or by the depression of a transaction key and then one of the total keys. The first method of releasing will now be described.

Figure 9:
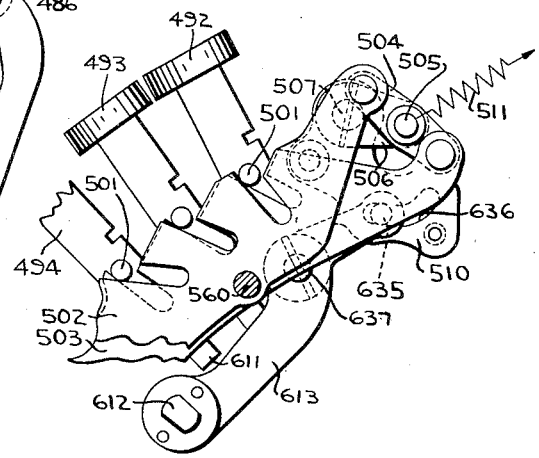
Fig. 9 is a detail side elevation of the block for holding the total plate in its "add" position, and the associated mechanism for removing the block upon depression of a total key.

When a total key is depressed and the lever 510, Figs. 9 and 37, is swung clockwise about its pivot on the shaft 507, is swings, with it, the rock arm 572, pivoted on the shaft 507, by contact with the stud 573 mounted thereon. This lowers the nose 574 from the path of the shoulder 575 on the lever 576, pivoted on the rod 577. Two arms 578 and 579, Figs. 29, 37, and 38, are pinned to the shaft 436 journaled in the machine frame, the arm 578 having a stud 581 secured to its end and lying within the bifurcation in the lower end of the lever 576. When the nose 574 is lowered, as just mentioned, a spring 582, fastened to the machine frame and to the arm 579, swings the arms 578 and 579 clockwise, and the lever 576 counter-clockwise until the shoulder 575 strikes the tooth 583 on the rock arm 572. This movement of the arms 578 and 579 raises the stud 581 on the arm 578 and the stud 584 on the arm 579. The stud 581 then rotates the lever 421, Figs. 34 and 38, the same as if the motor bar has been depressed, removing the block 426, Figs. 35 and 36, from the path of the stud 413, in the manner explained under heading 12. At the same time, the stud 584, Figs. 29 and 38 rocks, counterclockwise, the lever 585 pivoted on the rod 577, and also a stud 586, Figs. 28 and 29, secured to the lever 585, and resting against the hook 587, pivoted on the rod 577. The bell-crank 407, having a yoke 588 lying in the lower bifurcated end of the hook 587 is also rocked counter-clockwise, the same as if a transaction key had been depressed, removing the block 411, Figs. 30 and 31 from the path of the stud 413 in the manner explained under heading 12.

The removal of the blocks 411 and 426 from the path of the stud 413 allows the shaft 425 to be rotated by the spring 466, Fig. 8, to release and start the machine, in the manner explained under headings 12 and 13.

23. Automatic positioning of the total plate

Figure 11:
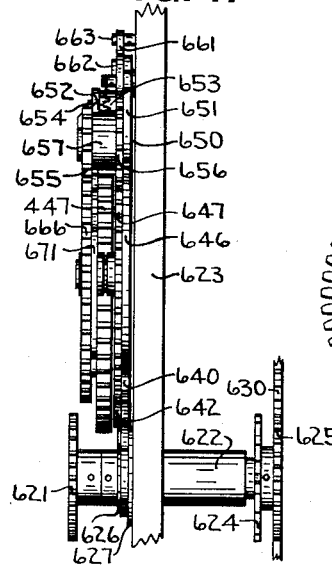
Fig. 11 is a back view and Figs. 12 and 13 are side elevations of parts of the controlling mechanism for total reading and resetting operations.

Cams 589 and 590, Fig. 3, are secured to the drive shaft 107 and cooperate with the rollers 591 and 592 on the actuator 593 to swing the actuator around its pivot on the stud 476. Two short links 594 and 595 are pivoted together at their lower ends and have a roller 596 mounted at the pivot point and lying within a slot 597 in the actuator 593. The links 594 and 595 are pivoted at their upper ends to the lower arms of the two converging levers 600 and 601, pivoted on the stud 602 and having upper arms 603 and 604, and ears 605 and 606. The arms 603 and 604 have flanges 607 and 610 extending at a right angle to the arms, and lying in a position to strike either the lower narrowed end 611, Fig. 9, of any depressed total key, or the stud 612 on lever 613. Two studs 614 and 615 extend from the arms 603 and 604, and lie in a position to strike the end of the front arm 616 of the setting lever 617, also pivoted on the stud 602. The rear arm 620 of the setting lever 617 has a rack meshed with the pinion 621 pinned to the shaft 622. The shaft extends through the frame plate 623, Fig. 11, and has an alining wheel 624 and another pinion 625 secured on its other end. Cams 626 and 627, Figs. 11 and 12, also are secured to the shaft 622 and cooperate with mechanism to be later described. The pinion 625 meshes with the rack on the total plate 630, Fig. 17, pivoted about the rod 125 and the alining wheel 624 cooperates with the aliner 632. The lever 224, pivoted at 225, is connected to the aliner 632 and imparts a vertical movement to it when the cam 223 rotates. A slot 633 in the upper end of the aliner 632 cooperates with the shaft 622 to guide the aliner in its vertical movement. A flange 634 is turned on the upper end of the aliner, and is moved into and out of the slots in the alining wheel 624 whenever the aliner is lowered or raised.

Referring to Fig. 9, when a total key is depressed, the cam lever 510 swings clockwise about its pivot at the shaft 507, moving the stud 635, on the upper end of the lever 613, into the lower end of the cam slot 636. This causes the lever 613 to swing clockwise about its pivot at 637, raising the stud 612 out of the path of the flanges 607 and 610, Fig. 3.

Considering now, that the total key 497 is depressed, the machine is immediately released, the stud 612 is raised, and the drive shaft 107 begins its rotation. The cam 233, Fig. 17, raises the aliner 632 to its upper position where the flange 634 is clear of the alining wheel 624 and holds it in this position for a short time, to permit a rotation of the shaft 622. The cam 589 then raises the actuator 593, spreading the upper ends of the links 594 and 595 and converging the arms 603 and 604. The arm 603 is stopped almost immediately by the narrow end of the key 497 lying in the path of the flange 607. The arm 604 continues downward, moving with it the arm 616, by its contact with the stud 615, until the cam 589 has moved the actuator to its highest point, at which time the arm 616 will lie approximately in line with the key 497. This movement of the arm 604 while the arm 603 was idle was permitted by the roller 596 running to the end of the slot 597. The downward movement of the arm 616 raises the rear arm 620, causing a clockwise rotation of the pinion 621, the shaft 622, the alining wheel 624, Fig. 17, the pinion 625, and the cams 626 and 627, Figs. 11 and 12. This clockwise movement of the pinion 625 rotates the total plate counterclockwise, to its position for resetting the amount registered on any totalizer in the line 122, Fig. 55, as will be later explained.

The cam 223, Fig. 17, then lowers the aliner 632 to the position shown in this figure, holding the total plate in its moved position. The arms 603 and 604, Fig. 3, then return to the position shown in that figure, being guided to their proper positions by the ears 605 and 606 striking the stationary stud 638.

During the second cycle of operation, the arms 603 and 604, and the aliner 632 are again operated as in the first cycle, this movement, however, amounting only to an idle operation, since the setting lever 617 was moved to its proper position during the first cycle.

The lever 617, the shaft 622, and the total plate 630 remain in their removed postions until the next succeeding operation of the machine, during the first part of which they will be moved to a position in line with another total key, if such is depressed, or will be moved to the position shown in Fig. 3 if an operation other than a total reading or resetting operation is begun, the stud 612 remaining in its lower position during such operations, and acting as a stop for the arms 603 and 604.

24. Engaging of the cycle control for total reading and resetting operations To allow the machine to operate through two cycles instead of one, and to stop it at the end of the second cycle, the machine is provided with a special cycle control mechanism, which will be described under the next heading, and which is engaged for operation by the mechanism now to be described.

Figure 12:
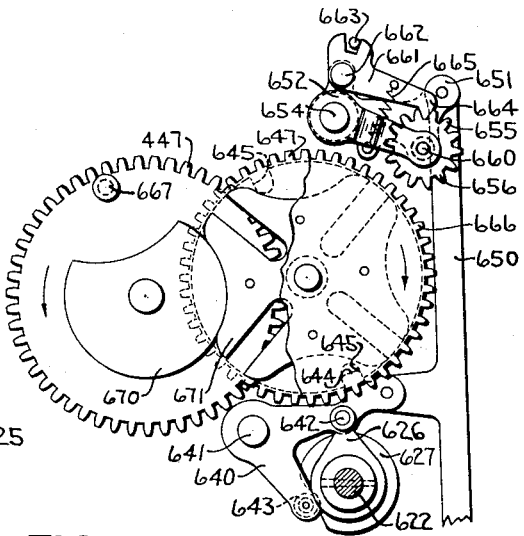

A bell-crank 640, Fig. 12 pivoted on the stud 641, has two rollers 642 and 643 cooperating with the cams 626 and 627 on the shaft 622. A finger 644 extends from the upper arm of the bell-crank 640 and lies within one of the two notches 645, Figs. 12 and 13, in the disk 646, secured to the gear 647. A link 650 is connected to the bell-crank and to the arm 651. An arm 652 is connected to the arm 651 by a yoke 653, Figs. 11 and 46, the arms and yoke being pivoted on the stud 654. Two pinions 655 and 656, connected by a sleeve 657, lie between the arms 651 and 652, and are supported on the rod 660 held by the arms. A detent 661 is pivoted on the stud 662 fastened to an upwardly extending portion of the arm 651, and has a notch in which extends the stud 663 secured to the machine frame. The nose 664 of the detent is normally held in mesh with the teeth of the pinion 656 by a spring 665 fastened to the detent and to the arm 651.

When the shaft 622 is rotated, following the depression of a total key, as explained under the previous heading, the cams 626 and 627 are rotated in one direction or the other, swinging the bell-crank 640 clockwise, removing the finger 644 from the notch 645 and lowering the link 650. This swings the arms 651 and 652 clockwise, lowering the pinions 655 and 656 into mesh with the gears 666 and 647. The clockwise movement of the arm 651 causes the stud 662 to move to the right, Fig. 12, swinging the detent 661 counter-clockwise about the stud 663 as a pivot, and removing the nose 664 from mesh with the pinion 656. The finger 644, the nose 664, and the Geneva gearing, to be described under the next heading, for the gear 666, maintain the gears 647 and 666 in proper alinement for meshing with the pinions 655 and 656. This meshing of the gears and pinions couples the machine drive to the gear 647 for a purpose to be explained under the next heading. Upon the first subsequent operation, other than a total reading or resetting operation, the cams 626 and 627 are returned to their former position during the first part of the operation, as described under the next preceding heading, restoring the parts to the position shown in Fig. 12.

25. Cycle control and machine release restoring mechanism for total reading and resetting operations The stud 667, Fig. 12, the raised portion 670, and the plate 671 secured to the gear 666 form a Geneva gearing between the driving gear 447 and the gear 666, for intermittently driving the latter. The gear 447 rotates one revolution for each cycle of the machine, while the plate 671 and the gear 666 rotate but one-fourth a revolution. Thus during a total reading or resetting operation, the gear 447 rotates two revolutions while the gear 666 rotates only one-half a revolution.

Figure 13:
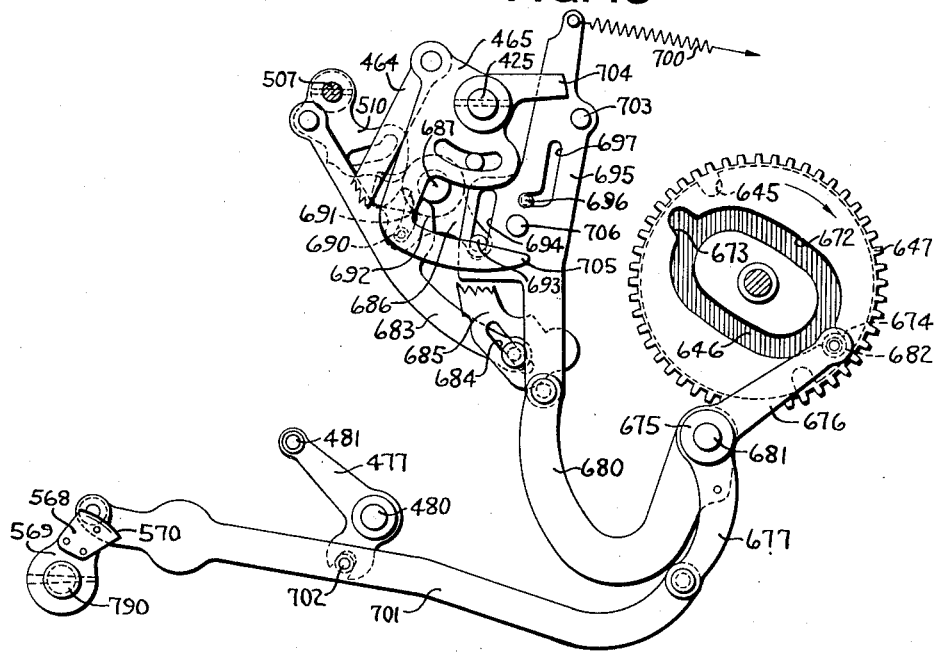

The gear 647 has a cam slot 672, Fig. 13, having two pockets 673 and 674. A bell-crank 675 having three arms 676, 677, and 680, is pivoted on the stationary stud 681, and has a roller 682 on the end of its arm 676. The roller 682 lies in one of the pockets 673, 674 at the end of each total reading or resetting operation, due to the gear 647 being driven by the gear 666, Fig. 12, which rotates only one-half a revolution for each operation.

Figure 20:
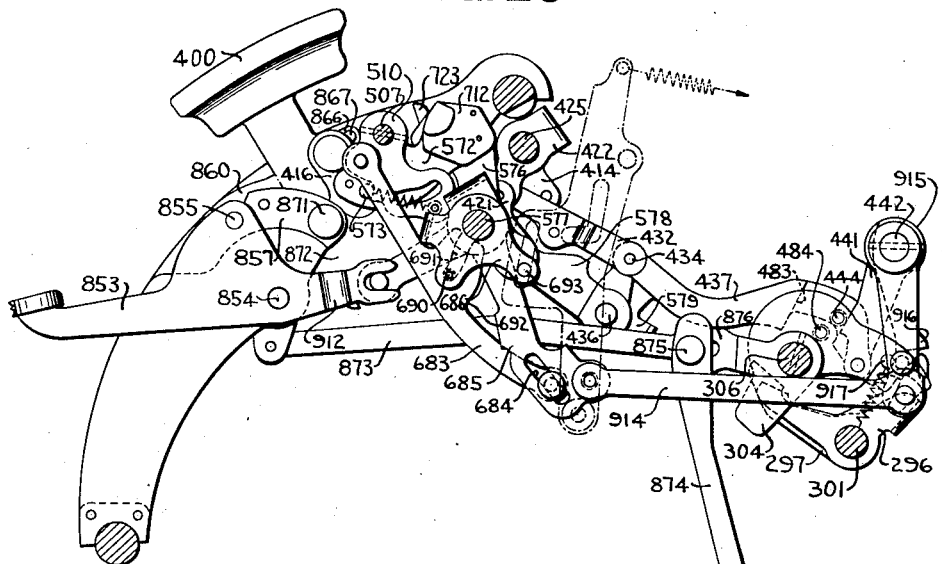
Fig. 20 is a side elevation of the repeat key and some of the parts controlled by it.

A link 683, Figs. 13 and 20, is pivoted, at its upper end, to the cam lever 510, and is mounted, at its lower end, for sliding movement in the slot 684 cut in the lower arm of the bell-crank 685. A bell-crank 686, pivoted on the stationary stud 687, has a stud 690 extending into a cam slot 691 cut in the ear 692 on the link 683, and also has a stud 693 extending into a slot 694 in the slide 695. This slide is pivoted, at its lower end, to the arm 680, and is guided in its movements by the stationary stud 696 extending into the slot 697. A spring 700, fastened to the top of the slide, keeps the upper end of the slide under constant tension to the right.

A link 701 is pivoted to the arm 677 and to the arm 569, and has a stud 702 lying within the notch in the lower arm of the bell-crank 477.

When a total key is being depressed, the cam lever 510 swings clockwise, lifting the link 683 and swinging, clockwise, the bell-crank 686. This moves the upper end of the slide 695 to the left against the tension of spring 700, and moves a stud 703 on the slide 695 under a finger 704 on the lever 465, and the stud 696 into the vertical portion of the slot 697. When the key reaches its fully depressed position, the shaft 425 and lever 465 are rotated clockwise, releasing the machine for operation, as explained under heading 22. The rotation of the lever 465 moves an arm 705, on the lever, from under a stud 706 on the slide 695, and moves the slide 695 downward, due to the contact of the finger 704 with the stud 703, and swings the bell-crank 675 counter-clockwise. This movement of the bell-crank moves the roller 682 out of the pocket 674 and moves the link 701 a short distance to the right, swinging the bell-crank 477 a short distance counter-clockwise and swinging the arm 569 a short distance clockwise. The swinging of the bell-crank 477 has no immediate effect on other mechanism, but the swinging of the arm 569 operates other parts which will be described later.

The machine then begins its operation, the gear 447, Fig. 12, being rotated in the direction of the arrow. Before the stud 667 reaches the plate 671, the shaft 622 and cams 626 and 627 are rotated, lowering the pinions 655 and 656 into mesh with the gears 666 and 647, and removing the nose 664 and the finger 644 from their alining positions, as explained under the previous heading. The stud 667 then moves into the plate 671 and rotates the gears 666 and 647 one-fourth a revolution. This moves the cam slot 672, Fig. 13, into a position where the roller 682 lies in one of the straight portions, which imparts a further counter-clockwise rotation to the bell-crank 675. This imparts an additional swing to the arm 569, the effect of which will be later described, and imparts an additional swing to the bell-crank 477 which swings the guide plate 474, Fig. 8, to the right, about its pivot on the stud 476. When the lever 465 received its clockwise movement to release the machine, the slide 464 was moved upward to the position where a notch 707, lying between the ear 473 and an ear 708, lay opposite a stationary stud 709. When the guide plate 474 is swung to the right, the slide 464 also is swung to the right, about its connection with the lever 465 as a pivot, causing the stud 709 to lie within the notch 707, and the ear 463 to be moved from under the stud 460 on the lever 456. Further rotation of the gear 447 causes the lever 456 to be swung counter-clockwise in its restoring movement, as explained under heading 14, but due to the ear 463 being moved from under the stud 460, the slide 464 does not receive its restoring movement, but is held stationary by the stud 709, and the machine is allowed to continue on a second cycle of operation.

When the stud 667, Fig. 12, rotates the gears 666 and 647 one-fourth a revolution on this cycle, the cam slot 672, Fig. 13, moves to a position where the roller 682 lies opposite the pocket 673, the movement swinging the bell-crank 675 to the position it assumed just after the machine was released, and prior to the first movement of the gear 647. This moves the slide 695, the link 701, and the bell-crank 477 proportionately, removing the notch 707, Fig. 8, from around the stud 709, and replacing the ear 463 in the path of the stud 460.

Upon further rotation of the gear 453, the lever 456 is again actuated, this time moving the slide 464 downward, restoring the machine release mechanism and stopping the machine. This restoring movement causes the arm 705, Fig. 13, to be swung under the stud 706, raising the stud and the slide 695 to a position where the stud 696, lies at the junction of the vertical and horizontal portions of the slot 697. This moves the roller 682 into the pocket 673 and swings the bell-crank 477 and the arm 569 to their home positions shown in this figure. This movement of the arm 569 removes the flange 570 from between the studs 571, Fig. 7, allowing the springs 511, Fig. 6, and 700, Fig. 13, to return the depressed total key and the slides 502 and 503, Fig. 5, and the lever 510, Fig. 13, link 683, bell-crank 686 and slide 695, to their home positions shown in these figures.

The lever 576, Fig. 37 is returned to its home position, with the shoulder 575 behind the nose 574, as shown in this figure, by the restoring movement of the shaft 425. During this movement of the shaft, the link 432 is moved to the right, as explained under heading 15, causing the stud 710 to swing the arm 578 downward through contact with the cam surface on its upper edge. This swings the lever 576 clockwise, allowing the spring 711, fastened to the rock arm 572 and the lever 510, to return the rock arm to its home position. Upon the return clockwise movement of the shaft 425, as explained under heading 15, the lever 576 comes to rest on the nose 574.

26. Nonrepeat mechanism for total keys

A nonrepeat pawl 712, Figs. 20 and 22 to 26, is pivoted on the pin 713 to the lever 576, through the shoulder 575, Figs. 22 to 24 and 37. On the opposite side of the lever 576, the pin 713, along with the pin 714, holds a latch 715 rigid with the pawl 712. A spacing sleeve 716 holds the latch and pawl in their proper spaced relation. A stud 717 extends from the pawl 712, and lies in the plane of the rock arm 572 to operate in relation with the tooth 583, under certain conditions. A hook 720 is pivoted on the stud 721 extending from the side of the lever 576, and has a nose 722 and a tail 723. The nose is adapted to extend under a toe 724 on the latch 715, while the tail 723 lies in a position to strike the shaft 507, Fig. 22, when the machine is released. A spring 725, Fig. 26, is fastened to the pin 714 and to a stud 726 on the hook 720, and tensions the pawl 712 and the nose 724 downward, and the lower end of the hook 720 upward.

Figure 22:
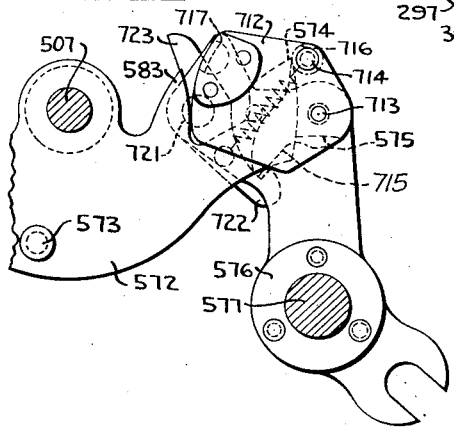
Fig. 22 is a side elevation of the non-repeat mechanism for the total keys shown in normal position.

The parts are normally in the position shown in Figs. 22 and 37. When the rock arm 572 is lowered to release the machine, the lever 576 swings counter-clockwise until the shoulder 575 rests against the tooth 583. This movement causes the tail 723 to strike the shaft 507, moving the nose 722 from under the toe 724, Fig. 26, and allowing the spring 725 to lower the pawl 712 to a position where the sleeve 716 rests on the upper edge of the lever 576. If after the key is depressed, the operator removes his finger from it to allow it to be raised at the end of the operation, the nose 574 returns to the position shown in Fig. 22, when the lever 576 is swung clockwise, at the end of the operation, as explained under the preceding heading. This clockwise movement is sufficient to carry the sleeve 716 clear of the nose 574 while the sleeve is in its lower position. When the lever 576 is swung counter-clockwise, at the very end of the restoring movement, the sleeve 716 comes into contact with the nose 574, stopping its movement to the left, as viewed from Fig. 22, and upon continued movement of the lever 576, causes a lifting of the pawl 712, stud 717, and toe 724, Fig. 26. This lifting is sufficient to restore the toe 724 over the nose 722, so that the pawl 712 will be held in its upper position while traveling toward the shaft 507 at the beginning of the next operation, to allow the stud 717 to pass over the tooth 583.

Figure 23:
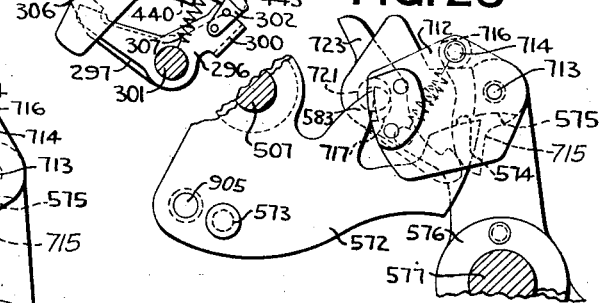
Fig. 23 is a side elevation of the non-repeat mechanism for the total keys, shown in the position it assumes when a total key is held depressed during a machine operation.

If, however, after the key is depressed, the operator holds it in its depressed position while the restoring movement is taking place, the rock arm 572 is held in the position shown in Fig. 23. The clockwise movement of the lever 576 takes place as before, but on the return counter-clockwise movement, instead of the nose 574 striking the sleeve 716 to lift the pawl 712, it remains out of contact with the sleeve, and fails to return the pawl to its raised position. The stud 717 also remains in its lower position, where it strikes the tooth 583, as shown in Fig. 23, preventing further counter-clockwise movement of the lever 576, which is necessary to release the machine. Since the nose 574 now extends under the shoulder 575, it cannot be returned to its proper position until the lever 576, is moved. To accomplish this, the shaft 425, Fig. 8, is rotated by manipulation of the handle 485, in the manner explained under heading 17. This moves the link 432, Fig. 37, to the right, and swings the lever 576 clockwise, as in the ordinary restoring operation of this mechanism. Upon the release of the handle 485, the lever 576 swings counter-clockwise, restoring the pawl 712 to its raised position, with the toe 724 resting above the nose 722.

Figure 10:
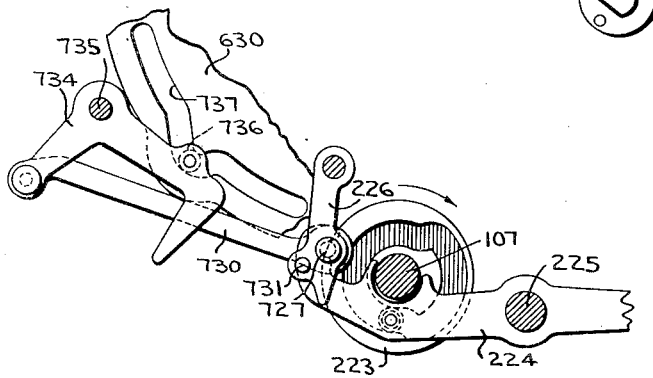
Fig. 10 is a detail side elevation of parts of the totalizer engaging mechanism with its disabling device, and parts of the total plate alining device.

27. Totalizer selection for total reading and resetting operations—Selection of totalizer line for engagement The link 226, Figs. 10 and 17, is pivoted at its lower end on a stud 727 on the end of a link 730, and has a stud 731 lying in the plane of the lug 732 extending downward from the machine frame. An end of the lever 224 extends between the links 226 and 730, and has a notch 733 therein, embracing the stud 727. The link 730 is pivoted at its opposite end to a bell-crank 734 pivoted, on its stud 735, to the machine frame. A roller 736 is mounted on the bell-crank 734, and rides in a cam slot 737, in the total plate 630.

During the first part of a reading or resetting operation, immediately after the totalizers employed in the previous operation are disengaged, the cam 223 swings the lever 224 counter-clockwise, pulling the link 226 downward, moving the studs 242 clear of the high spots on the disks 210 and 211, Figs. 2 and 17, and lowering the stud 731 to a position opposite the notch 740 in the lug 732. The total lever 630 is then moved one way or the other, depending upon whether a reading or a resetting key is depressed, swinging the bell-crank 734 counter-clockwise, by its connection with the cam slot 737, moving the link 730 to the right, and swinging the stud 727 out of the notch 733 and the stud 731 into the notch 740. The stud 731 remains in this position throughout the operation, and is not returned to its former position until the total plate is returned to its "add" position during a subsequent operation of the machine. This movement of the stud 731 insures that the studs 233, 234, and 235 will remain stationary throughout the operation, making the movement of the levers 236, 237, and 240 entirely dependent upon the movement of the studs 242.

Figure 18:
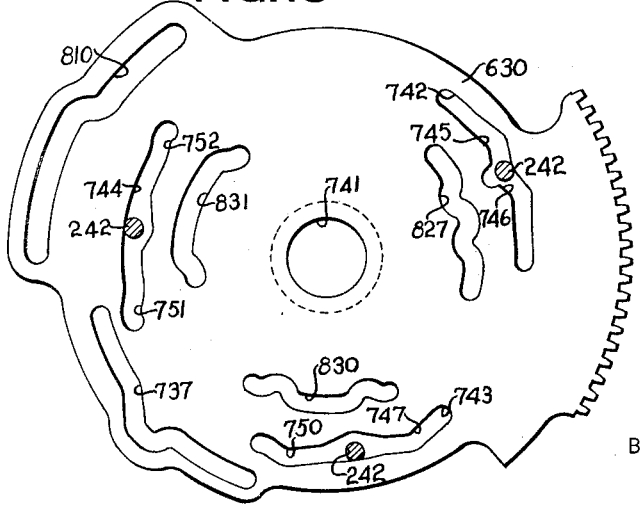
Fig. 18 is a detail side elevation of the total plate.

The movement of the total plate, just described, causes one of the studs 242 to be held in a position farther away from the hub 741, Fig. 18, than that shown in the figure, due to the configuration of the slots 742, 743, and 744 through which the studs 242 extend. If the total key 494, Fig. 2, was depressed, the stud 242 in the slot 742, controlling the engaging of the "Balance" totalizer, would rest on the hump 745, the movement of the stud 242 causing the link 245, Fig. 17, to be swung to the right the stud 243 moving from the recess 247, into the slot 250, and into engagement with hook 251, as shown in Figs. 14 and 17. If the total key 495 was depressed, the stud 242 would rest on the hump 746, and the stud 243 would again lie in the position shown in Figs. 14 and 17. Likewise, when the total keys for the second and third transaction banks are depressed, the studs 242 lying in the slots 743 and 744, Fig. 18, are moved away from the hub 741 by the humps 747, 750, 751 and 752, to select totalizer lines 121 and 122, Fig. 55, for engagement.

Many of the details of this selecting mechanism are shown in the United States Patent No. 1,619,796 to B. M. Shipley, to which reference may be had for a more detailed description.

28. *Totalizer selection for total reading and resetting operations—Automatic selection of adding or subtracting side of the "balance" totalizer*

An arm 753, Fig. 44, is secured to the end of the shaft 383, to which is also secured the rocker 382, Fig. 52, the reciprocating movement of which has already been explained under heading 10. A link 754 is pivoted to the stud 755 on the end of the arm 753, and holds one end of a spring 756, secured at its other end to the machine frame. The spring and link hold the rocker 382 and arm 753 against accidental displacement, when lying in either of their positions, the movement of the rocker and arm being limited in both directions by the stationary studs 757 and 760.

A link 761 is pivoted on the stud 755 and to the upper end of a lever 762 pivoted on the rod 272. An arm 763 is pivoted on the rod 272 and is connected to the lever 762 by a yoke 764, Fig. 46. The upper end of the arm 763 is flattened, and lies in a position where it may be swung under a stud 765, Figs. 39 and 43, on a plate 766, pivoted on the stud 767, to the lever 190.

Figure 43:
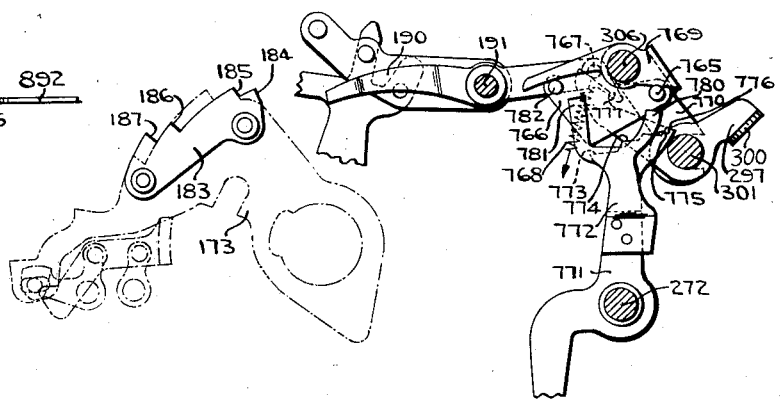
Fig. 43 is a detail view of certain parts of the totalizer selecting mechanism shown in Fig. 39.

The plate 766 is tensioned downward by a spring 768, but is normally held in its elevated position, shown in Fig. 43, by the lever 297 bearing against the stud 767, and is held in its proper pivoted position by the studs 765 and 782 striking the bottom edge of a yoked bracket 769, Figs. 43 and 46, supported on the shaft 306, and held stationary by its arm 770 embracing the rod 301.

A lever 771 is pivoted on the rod 272, and has an arm 772 secured to it. The upper end of the lever 771 is widened and has four steps 773, 774, 775, and 776, all lying in a position to stop the movement of the lever 190 by contact with its nose 777, when the levers 771 and 190 are swung about their pivots. The arm 772 has two prongs 780 and 781, the prong 780 lying under the stud 765 when the lever 771 is in home position as shown in Fig. 43, and the prong 781 lying under a stud 782 on the plate 766, when the lever 771 is rotated one step counter-clockwise. A link 783, Figs. 6 and 39, is pivoted to the lower end of the lever 771, and to an arm 784 secured to the shaft 522.

During adding and subtracting operations, when the latch 304, Fig. 39, is lifted, and the bell-cranks 296 and 297 rotated, the spring 768, Fig. 43, pulls the plate 766 and the rear end of the lever 190 downward. The stud 765 strikes the prong 780, causing the plate 766 to pivot on the stud 767, the stud 782 dropping along the side of the prong 781. This downward movement is arrested by the nose 777 resting on the step 773, at which time the front end of the lever 190 is entirely out of the path of the plate 183. This allows the lever 188, Fig. 39, to cooperate with a shoulder on the arm 173 to determine in what position the arm is to stop, as explained under heading 8.

Figure 5:
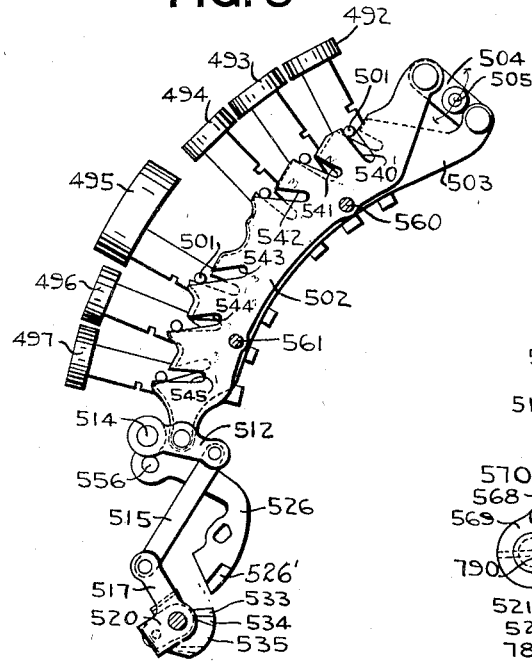
Figs. 5 and 6 are side elevations of the total keys and their inter-lock slides.
Figure 6:
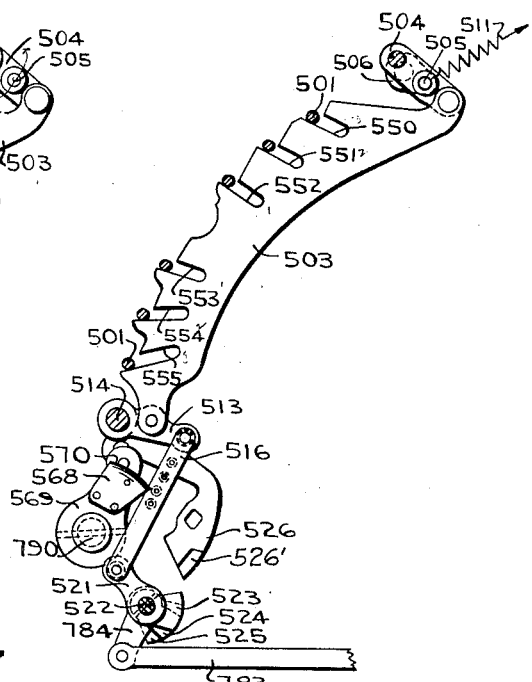

When either of the total keys 494, or 495, Fig. 5, for the "Balance" totalizer is depressed, the locking plate 503, Fig. 6, is moved downward one step, moving the link 783 one step to the right, and swinging the arm 772 and the upper end of lever 771 one step to the left. This places the prong 781 under the stud 782, and moves the prong 780 from under the stud 765. If the "Balance" totalizer is not overdrafted, the arm 763 lies in the position shown in Figs. 39 and 44, out of the path of the stud 765, Fig. 43, and upon the subsequent downward movement of the plate 766, the stud 765 is allowed to move down beside the prong 780 until the nose 777 rests on the step 774, the stud 782 being held elevated by the prong 781 during this movement. The lever 190 now lies in the path of the shoulder 187 on the plate 183, and, upon actuation of the arm 173, arrests its movement in the "7" position, as explained under heading 3, causing a shifting of the "Balance" totalizer to its adding position, as explained under heading 5.

If, during a subtracting operation, the "Balance" totalizer overdrafts, the rocker 382, Fig. 52, is moved to its position counter-clockwise of that shown in the figure, as explained under heading 11, and the arm 753, Fig. 44 is moved to a similar position, resting against the stud 757, causing the arm 763 to move under the stud 765, Figs. 39 and 43, which is held elevated, by the prong 780, out of the path of the arm 763, during subtract operations as above described. If either of the total keys 494 or 495 is depressed for a subsequent operation with the totalizer in this state, the downward movement of the plate 766 is arrested by the prong 781 and arm 763. The prong 781 is moved under the stud 782 by depression of either of these total keys as above described. Then when the stud 782 strikes the prong 781 and stud 765 strikes the arm 763 the lever 190 is stopped in the path of the shoulder 184. The movement of the arm 173 is now arrested in the "2" position, causing a shifting of the "Balance" totalizer to its subtracting side, as explained under heading 5.

The steps 775 and 776 are used when the total keys for the second and third transaction banks are depressed and stop the arm 173 in its "6" and "3" positions, respectively, for purposes of column selection in the printing mechanism.

Figures 15, 16:
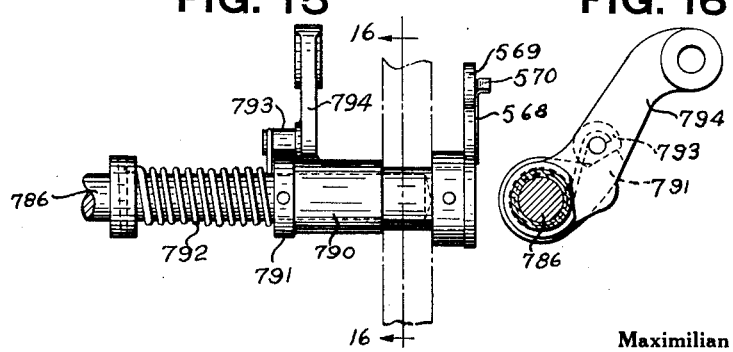
Fig. 15 is a detail front elevation of a shaft shown in Fig. 14.
Fig. 16 is a sectional side view taken on the line 16—16 of Fig. 15.

During total reading and resetting operations involving the "Balance" totalizer, since no transaction key is depressed, the zero stop pawl 195, Fig. 39, must be withdrawn by other means, to permit the actuation of the arm 173. For this purpose a tappet 785 is pinned to the throwout shaft 786, and normally rests on a tail 787 of the pawl 195. The shaft 786, Figs. 15 and 16, is journaled in the sleeve 790, in turn journaled in the machine frame. A tappet 791, pinned to the shaft 786, is tensioned, by a spring 792, against a stud 793 projecting from an arm 794 formed on the sleeve 790. The arm 569 is secured on the other end of the sleeve. By this arrangement, a rotation may be imparted to the shaft either by movement of the arm 569, or by a clockwise rotation, Fig. 16, of the shaft 786 while the arm 569 is held stationary.

When a total key is depressed, the machine release mechanism pulls the link 701, Fig. 13, to the right, as explained under heading 25 swinging the arm 569 a short distance clockwise. This rotates the sleeve 790, Figs. 15 and 16, and the shaft 786, correspondingly, causing the tappet 785 to press down on the tail 787 and withdraw the pawl 195 from the path of the arm 173.

29. Totalizer selection for total reading and resetting operations—Lateral shifting of totalizers for second and third transaction banks When it is desired to read or reset the individual total registered by any key in the second and third transaction banks, the desired transaction key and one of the corresponding total keys are depressed. The depression of the total key releases the machine, causing the differential mechanism in the transaction bank of the depressed key to shift the totalizer line under its control to the position determined by the depressed key, in the same manner as described under headings Nos. 3 and 5.

30. Control of amount key banks during total reading and resetting operations Two arms 795, one of which is shown in Fig. 55, are pinned to the shaft 786, at each end of the amount key banks, and have a rod 796 extending between them and in front of the interlock pawl 797 for each amount key bank. When the rod 796 is in its home position shown in Fig. 55, the amount keys may be depressed, since the lower end of the pawl 797, which receives a positive movement whenever a key is depressed, will move under the rod 796 without obstruction, but when a clockwise movement is given the arm 795, the rod 796 moves in the path of the lower end of the pawl 797, preventing its movement and the consequent depression of an amount key. This arrangement of parts is well known in the art, as shown by the United States Patent No. 1,230,864 to W. A. Chryst, but its operation is changed, as will now be described. As explained under headings 22 and 25, when a total key is depressed, the slide 695, Fig. 13 is moved to the left, placing the stud 703 under the finger 704, compelling a movement of the slide 695, the bell-crank 675, the link 701, the arm 569, and the shaft 786, Fig. 55, before the machine is released for operation. If, before the total key is depressed, it is attempted to mismanipulate the machine by depressing an amount key, the lower end of the pawl 797 will extend under the rod 796, preventing the rotation of the shaft 425, Fig. 13, and the consequent release of the machine. It would then be necessary to restore the release mechanism by manipulation of the handle 485, as explained under headings 17 and 25.

When the machine is properly released by a total key, the first movement of the bell-crank 675, explained under heading No. 25, which is just sufficient to move the roller 682 into the slot 612, is also just sufficient to lower the rod 796, Fig. 55 into contact with a tail 800 on the zero stop pawl 103 of each amount bank. In this position the rod lies in front of the lower end of the pawl 797, and prevents the depression of an amount key after the machine is released. The one-fourth of a rotation given the gear 647, Fig. 13, near the end of the first cycle, rotates the shaft 786 an additional distance, causing the rod 796 to press downward on the tail 800, Fig. 55, withdrawing the pawl 103 in each amount bank. This withdrawal takes place, however, after the differential mechanism has completed its upward movement for the first cycle, the latches 115 all having been disengaged in the zero position. The rod 796 is held in this position until the latter part of the second cycle, allowing the amount differential mechanisms to travel upward unmolested by the pawls 103 during the second cycle. The last two movements given the bell-crank 675, Fig. 13, return the arms 795, Fig. 55 and rod 796 to their home positions shown in this figure, as explained under heading 25.

31. Totalizer engaging mechanism for total reading and resetting operations

A bell-crank 801, Fig. 14, is pivoted on a stationary stud 802, and has cam slots 803 and 804 at its upper and lower ends. An arm 805 is likewise pivoted on the stud 802, and has a straight slot 806 in its upper end, and a roller 807 extending in the cam slot 810, in the total plate 630. A link 811 is pivoted to the arm 794, and has a headed stud 812 on its other end, extending through the slots 803 and 806. A roller 813 is mounted on the bell-crank 801, and extends into the slot 814 in the link 221. Two notches 815 and 816, in the link 221 cooperate with two studs 817 and 820, in the spider 222, to oscillate the spider and engage and disengage whatever totalizer line has been connected therewith. An aliner 821 is pivoted on a stationary stud 822, and has a roller 823 extending in the slot 804, and a stud 824 cooperating with notches 825 and 826 in the spider 222.

When one of the total reading keys 492, 493, 494, Fig. 2, is depressed, the arm 569 is immediately swung clockwise, as explained under heading 25, lowering the arm 794 and the link 811 until the stud 812 rests in the lower end of the straight portion of the slot 803. Immediately thereafter, presuming the previous operation to be one of adding or subtracting, the cam 217 actuates the bell-crank 220, moving the link 221 to the left and the spider 222 counter-clockwise to the position shown in Fig. 14, disengaging any totalizer lines engaged during such previous operation. The total plate 630 then moves a distance clockwise, as explained under heading 23. Shortly thereafter, the cam 252 pulls the link 221 to the right, rotating the spider clockwise and engaging whatever totalizer was selected by the mechanism described under heading 27. The arm 569 then receives its second clockwise movement, pulling the stud 812 to the bottom of slots 803 and 806, and causing the bell-crank 801 to swing clockwise to its middle position. Through its connection with the roller 813, the link 221 is lowered to its middle position, where it is disconnected from the spider 222. This movement of the bell-crank 801 also causes the aliner 821 to rotate counter-clockwise, moving the stud 824 into the notch 826 now in line therewith, to hold the spider 222 stationary while it is disengaged from the link 221. At the beginning of the second cycle, the cam 217 moves the link 221 to the left, while disengaged from the spider 222, and then returns it by a movement to the right, completing an idle operation. The arm 569 then receives its first counter-clockwise movement, swinging the bell-crank 801 counter-clockwise, reengaging the notch 815 with the stud 817, and disengaging the stud 824 from the notch 826. The arm then receives its second counter-clockwise movement, restoring the stud 812 to the top of the slots 803 and 806, completing the operation.

When one of the total resetting keys 495, 496, 497, is depressed, the arm 569 is immediately swung clockwise, lowering the stud 812 to the lower end of the straight portion of the slot 803. The cam 217 then moves the link 221 to the left, to the position shown in Fig. 14, returning any totalizers engaged during the previous operation. The operations thus far are identical with the reading operation just described. The total plate 630 is then rotated counter-clockwise, moving its slot 810 downward, and swinging the arm 805, the link 811, and the bell-crank 801 to the right placing the latter in its middle position. This lowers the link 221 to its middle position and engages the stud 824 in the notch 825. The cam 252 then pulls the link 221 to the right, on an idle movement. The arm 569 then receives its second clockwise movement, pulling the stud to the bottom of slots 803 and 806, and thereby lowering the link 221 to its lower position, where the notch 816 engages the stud 820, and disengages the stud 824 from the notch 825. At the beginning of the second cycle, the cam 217 moves the link 221 to the left, rotating the spider 222 clockwise and engaging the selected totalizer. After an interval, the cam 252 pulls the link to the right, disengaging the totalizer. The arm 569 then receives its two counter-clockwise movements, raising the stud to the top of the slots 803 and 806, returning the bell-crank 801 and link 221 to their middle positions, and engaging the stud 824 with the notch 825.

An adding or subtracting operation performed after a resetting operation is conducted a little different during the first part of the operation. Inasmuch as the totalizer line engaged during the resetting operation is disengaged, the link 221 makes an idle movement to the left at the beginning of the operation. The total plate 630 then moves clockwise to the position shown in Fig. 14, and by the cam 810, moves the link 811, the arm 805, the bell-crank 801, the link 221, and the aliner 821 to the position shown in the figure, where the link 221 is coupled with the spider 222 to engage the totalizers selected for the adding or subtracting operation.

32. Selection of reset shaft and operation of reset spider

Figure 56:
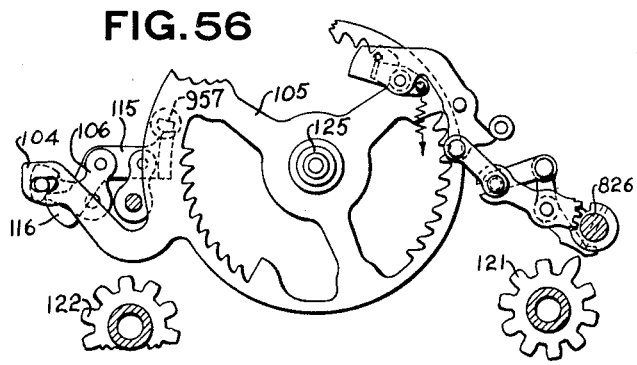
Fig. 56 is a detail view of the resetting mechanism shown in Fig. 55.

The particular reset shaft 826, Fig. 56 to be employed during a reading or resetting operation is selected by the slots 827, 830 and 831, Fig. 18, when the total plate 630 is positioned during such an operation in the same manner as shown and described in the United States Patent No. 1,619,796 to B. M. Shipley. The mechanisms for rotating the shaft 826 and for arresting the movement of the reset spider 105 when its corresponding totalizer wheel is returned to zero by the differential rack 114, Fig. 55, are likewise shown and described in the Shipley patent.

33. Total reading operation

Assuming it is desired to read the total amount of certified checks registered by the machine, the "Certified check" key 135, Fig. 2, is depressed, withdrawing the zero stop pawl 832, Fig. 41, in the second transaction bank, as explained under heading 1. The total key 493, Fig. 2, is then depressed, releasing the machine for operation as explained under headings 22 and 25, and moving the stud 812, Fig. 14, to the lower end of the straight portion of the slot 803, as explained under heading 31. The machine then starts its operation, first disengaging any totalizers engaged during the previous operation, as explained under heading 31. Next, the aliners 131, Fig. 52, and 632, Fig. 17, are rocked out, and part of the totalizer line selecting mechanism is actuated by the cam 223, as explained under headings 3, 23, and 27. The differential mechanism for the second transaction bank then moves up, shifting its totalizer line to the position determined by the depressed key 135, as explained under headings 3 and 5, and at the same time the total plate 630, Fig. 14, is positioned in accordance with the depressed total key 493, as explained under heading 23. The movement of the plate selects the proper totalizer line for engagement and the proper reset shaft for rotation, as explained under headings 27 and 32. The aliners 131 and 632 are then moved into engagement, holding the totalizer shifting mechanism and the total plate in their moved positions. The selected totalizer is then engaged and the reset shaft 826, Fig. 56, is rocked to operative position as explained under headings 31 and 32. The cam 672, Fig. 13, then moves the slide 464, Fig. 8, out of operative relation with the lever 456, and lowers the arm 794, Fig. 14, disengaging the link 221 from the spider 222, as explained under headings 25 and 31, and withdrawing the zero stop pawls in the amount key banks, as explained under heading 30. At the same time, the transaction differential mechanism returns to its lower position, completing its operative movement. The lever 456 then executes an idle movement, as explained under heading 25, completing the first cycle of operation.

At the beginning of the second cycle, the link 221 is given an idle movement to the left, Fig. 14, as explained under heading 31. This is followed by the aliners 131 and 632 again moving out, the latter performing no function during this cycle, as explained under headings 3 and 23. The amount differential racks 114, Fig. 55, then rotate clockwise, returning the totalizer to zero, as explained under heading 32, and at the same time, the transaction differential mechanism moves up on its idle operation. The aliner 131 now rocks in, retaining the new setting of the segments 127, Fig. 55, for both the amount and transaction banks, and at the same time the aliner 632 returns from its idle operation. The links 221, Fig. 14, is next moved to the right, and this is followed by the cam 672, Fig. 13, engaging the link 221 with the spider 222, and moving the slide 464 into operative relation with the lever 456. At the same time, the transaction differential completes its idle operation, and the differential racks 114, Fig. 55, rotate counter-clockwise, while the totalizer is still engaged, returning the former setting to the wheels thereof. The lever 456, Fig. 8, then stops the machine and restores certain of the parts to their home positions, as explained under headings 14, 15, 16 and 25, completing the operation.

34. Total resetting operation

If it is desired to reset the Balance totalizer, the total key 495, Fig. 2, is depressed, releasing the machine for operation, as explained under headings 22 and 25, withdrawing the pawl 195, Fig. 39, as explained under heading 28, and moving the stud 812, Fig. 14, to the lower end of the straight portion of the slot 803, as explained under heading 31. The machine then starts its operation, first disengaging any totalizers engaged during the previous operation, as explained under heading 31. Next, the aliners 131, Fig. 52, and 632, Fig. 17, are rocked out, and part of the totalizer line selecting mechanism is actuated by the cam 223, as explained under headings 3, 23, and 27. Assuming that the Balance totalizer is overdrafted, the differential for the first transaction bank will be stopped in the "2" position, shifting the Balance totalizer to its subtracting side, as explained under heading 28. At the same time, the total plate 630, Fig. 14, is positioned in accordance with the depressed total key 495, as explained under heading 23. The movement of the plate selects the proper totalizer line for engagement and the proper reset shaft for rotation, as explained under headings 27 and 32, and also disengages the link 221 from the spider 222, as explained under heading 31. The aliners 131 and 632 are then moved into engagement, holding the totalizer shifting mechanism and the total plate in their moved positions, the link 221 being then moved idly to the right. The cam 672, Fig. 13, then moves the slide 464, Fig. 8, out of operation with lever 456, withdraws the zero stop pawls 103, Fig. 55, in the amount key banks and engages the lever 221, Fig. 14 on its lower stud, as explained under headings 25, 30, and 31. At the same time, the differential for the first transaction bank returns to home position. The lever 456, Fig. 8, then executes an idle movement, as explained under heading 25, completing the first cycle.

At the beginning of the second cycle, the Balance totalizer is engaged by movement of the link 221, Fig. 14, to the left, the selected reset shaft being rocked into operative position at the same time. The aliner 131, Fig. 52, is then moved out and the cam 223, Fig. 17, moves the aliner 632 up, on its idle movement. The racks 114, Fig. 55, then rotate clockwise, returning the totalizer to zero, as explained under heading 32, and at the same time, the differential in the first transaction bank moves up on its idle operation. The aliner 131, Fig. 52 now rocks in retaining the new setting of the segments 127, Fig. 55, for both the amount and transaction banks, and at the same time, the aliner 632, Fig. 17, returns from its idle operation. The link 221, Fig. 14, is now moved to the right, disengaging the totalizer from the amount racks 114, Fig. 55. The cam 672, Fig. 13, then disengages the link 221, Fig. 14, from the spider 222 and returns the slide 464, Fig. 8, into operative relation with the lever 456. At the same time the transaction differential returns from its idle operation and the amount racks 114, return home, disengaged from the totalizer, and leaving it in its zero position. The lever 456, Fig. 8, then completes the operation by stopping the machine and returning certain of the parts to their home positions as explained under headings 14, 15, 16 and 25.

35. Adding or subtracting operation after a total resetting operation

Since the totalizer engaged during a resetting operation is disengaged at the end, unlike adding, subtracting and reading operations, the link 221, Fig. 14, is moved idly to the left at the beginning of an adding or subtracting operation. The aliners 131 and 632, Figs. 52 and 17, then move out, followed by the amount and transaction differentials beginning their upward movement. At this time, the total plate 630, Fig. 14, is moved to its middle position, causing the bell crank 801 to be moved by the cam slot 810, and moving the link 221 into engagement with the stud 817 on the spider 222. The link 221 is then pulled to the right, engaging the selected totalizer lines, and the machine proceeds as in an ordinary adding or subtracting operation.

36. Visual indication of negative total

The segment 833, Fig. 39, set by the differential for the first transaction bank, moves a rack, not shown, but illustrated and described in the parent application, through the pinions 835 and 836, and the shaft 837. These connections set a type wheel to print a designating character to indicate when a printed total is a negative one.

REPEATING

37. Automatic selection of totalizer to receive repeated amount

Figure 42:
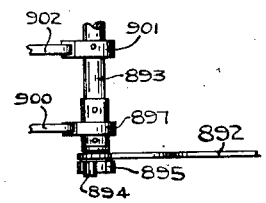
Fig. 42 is a detail plan view of parts shown in Fig. 41.

A repeat key 853, Figs. 20 and 37, is pivoted on a stationary stud 854 and has a stud 855 lying in a notch 856 in a link 857. A lever 860 is pivoted on a stationary stud 861 and has a slot 862 in which rides a stud 863, secured to the link 857 and extending through a slot 864, Fig. 34, in the support 865. A reversible arm 866, Fig. 37, also is pivoted on the stud 861, and has a stud 867 lying over the lever 860 and tensioned downward by a spring 870. This tensions the lever 860 clockwise, and holds the link 857 in engagement with the key 853. The link 857 is pivoted on a stud 871 secured to a bell crank 872 also pivoted on the stud 854. A link 873 is pivoted to the bell crank 872 and to another link 874 by a long stud 875. An arm 876, pinned to the shaft 306, lies between the links 873 and 874, and has a notch 877 lying opposite the stud 875. The link 874 is pivoted at its lower end to a yoked lever 880, Fig. 20, pivoted on a shaft 881, and having a rocker 882, Figs. 20 and 41, pivoted to its arm 883. The rocker 882 pivots on its stud 884 and is restricted in this movement by its stud 885 lying in the cut out portion 886 of the arm 883. A front flange 887 and a rear flange 890 extend from the rocker 882, and are adapted to cooperate with the widened end of the lower arm 891 of the lever 762. A pitman 892 is pivoted to the stud 885 on the rocker 882, and is bifurcated at its other end to slide on a shaft 893. A stud 894 on the upper prong of the bifurcation lies in front of a tappet 895 pinned to the shaft 893, and a stud 896 on the lower prong of the bifurcation lies behind a bell crank 897, pivoted on the shaft 893, and having an arm lying under the tail 900 of the zero stop pawl 832 in the second transaction bank. Another tappet 901, Figs. 42 and 44, also is pinned to the shaft 893, and lies under the tail 902 of the zero stop pawl 142 in the third transaction bank.

When it is desired to enter into one of the totalizers controlled by keys 136 and 141, Fig. 2, the amount entered during the previous operation, the proper totalizer will be automatically selected, in accordance with the algebraic state of the number, upon depression of the repeat key 853, by the mechanism just described. When the key is depressed, the link 857 is pulled to the left, rotating counter-clockwise the bell crank 872 and moving the link 873 to the right until the stud 875 lies within the notch 877. Subsequent upward movement of the arm 876 will then lift the link 874 and the arm 883, and will cause the stud 885 and the pitman 892 to move to the right or left. If the Balance totalizer is not overdrafted, the arm 753, Fig. 44, will be lying in the position shown, as explained under heading 28, and the arm 891, Fig. 41, will be in its forward position. The upward movement of the arm 883 will then cause the flange 887 to strike the widened end of the arm 891 and swing the rocker 882 counter-clockwise. This moves the pitman 892 forward, lifting the bell crank 897 and the tail 900, and withdrawing the zero stop pawl 832. The differential for the second transaction bank is now free to swing upward until it is stopped in its "9" position by a stationary stud, as explained under heading 3. The amount will then be registered in the "New balance" totalizer.

If the balance totalizer is overdrafted when the operation takes place, the arm 753 will be in its forward position, resting against the stud 757, and the arm 891 will be in its rear position. The upward movement of the arm 883 will then cause the flange 890 to strike the widened end of the arm 891 and swing the rocker 882 clockwise. This moves the pitman 892 to the rear, swinging the tappets 895 and 901 clockwise, and raising the tail 902 to withdraw the zero stop pawl 142. The differential for the third transaction bank is now free to swing upward until it is stopped in its "9" position, as in the former case. The amount will then be registered in the "New balance —" totalizer.

38. Manual selection of totalizer to receive repeated amount

When it is desired to use a manual, rather than an automatic selection of the totalizer to receive the repeated amount, it is only necessary to swing the arm 866, Fig. 37, counter-clockwise about the stud 861, until the stud 867 again rests on the lever 860. The spring 870 will now depress the lower end of the lever 860, moving the stud 863 downward into the vertical portion of the slot 864, Fig. 34, and disconnecting the notch 856, Fig. 37, from the stud 855. The lowering of the link 857 locks the bell crank 872 and the link 873 in the position shown in the figure, where the stud 875 is disconnected from the arm 876, and allows the depression of the repeat key 853 as usual. Now, the link 874 will not be raised by the arm 876 during the operation, and the rocker 882 and its associated parts will not function to remove one of the zero stop pawls 832, 142. It is now necessary to depress one of the keys 136, 141, to select the proper totalizer, and, as will later appear, to release the machine for operation.

39. Machine release mechanism for repeating operations

When using the automatic totalizer selection, it is only necessary to depress the repeat key 853. This swings the bell crank 872, Fig. 37, counter-clockwise, causing its tooth 904 to rotate the rock arm 572 by striking its stud 905. This lowers the nose 574 below the shoulder 575 and releases the machine in the same manner as explained under heading 22.

When the manual selection of the totalizer is used, depression of the transaction key 136 or 141 removes the block 411, Fig. 31, from the stud 413, as explained under heading 12, and upon the subsequent depression of the repeat key 853, Fig. 34, its roller 906 lowers the lever 416 the same as if the motor bar 400 had been depressed, removing the block 426, Figs. 35 and 36, from the stud 413, as also described under heading 12. The removal of these two blocks 411 and 426 allows the shaft 425 to rotate and release the machine in the manner explained under the aforementioned heading.

The release mechanism is restored as in other operations.

40. Interlocks with the repeat key.

An accurate surface 907, Fig. 37, and a cut out portion 910 are provided on the bell crank 872 to cooperate with a stud 911 on lever 510, to act as an interlock between the repeat and total keys. If the repeat key is depressed first, the surface 907 moves in front of the stud 911 and prevents the subsequent depression of a total key, the movement of the lever 510 to the left being necessary to the depression of the key, as can be seen from heading 21. If a total key is depressed first, the stud 911 moves in the cut out portion 910, and prevents counter-clockwise movement of the bell crank 872, and depression of the repeat key.

A bifurcated arm 912, Fig. 20, connects the repeat key with the bell crank 685, pivoted on the rod 577. When the repeat key is depressed, the lower arm of the bell crank 685 swings the link 683 to the left, raising the stud 690, rotating the bell crank 686, and moving the slide 695, Fig. 13, to the left. When the repeat key is fully depressed, the machine releases, the finger 704 pressing the slide 695 downward and rotating the shaft 786, Fig. 55, to prevent the subsequent depression of an amount key, as explained under heading 30.

If an amount key is depressed first, and the repeat key then depressed, the rotation of shaft 425 and the attendant releasing of the machine is prevented in the manner also described under heading 30.

It will be noted that although the slide 695, bell crank 675, link 701, bell crank 477, arm 569 and shaft 786 are given their first step of movement in repeating operations the same as in total reading and resetting operations, they do not receive their second step of movement by the cam 672, since the pinions 655, 656, Fig. 12, do not connect the gear 647, Fig. 13 with the gear 666, Fig. 12, for rotation during the repeating operations. This first step of movement was given only for the purpose of interlocking the repeat and amount keys, and affects the operation in no other way.

A link 914, Fig. 20, is pivoted to the bell crank 685 and to an arm 915 pinned to the shaft 442. An arm 916 also is pinned to the shaft 442, and cooperates with a stud 917 on the latch 304, Figs. 20 and 46.

When the repeat key is depressed, the link 914 is moved to the left, swinging the arms 915 and 916 to the left, the lower end of arm 916 moving over and past the stud 917. Thus, when the machine is released for any operation other than a repeat operation, the consequent swinging of the latch 304 counter-clockwise, raises the stud 917 in front of the arm 916 and prevents a subsequent depression of the repeat key.

When the repeat key is depressed on an ordinary repeating operation, the arm 916 passes over the stud 917, the latter rising behind the arm when the latch 304 is moved at the end of the depression. This retains the arm 916 and likewise the repeat key in their moved positions until the latch 304 is returned at the end of the operation.

41. Control of amount differentials during repeating operations

Figure 59:
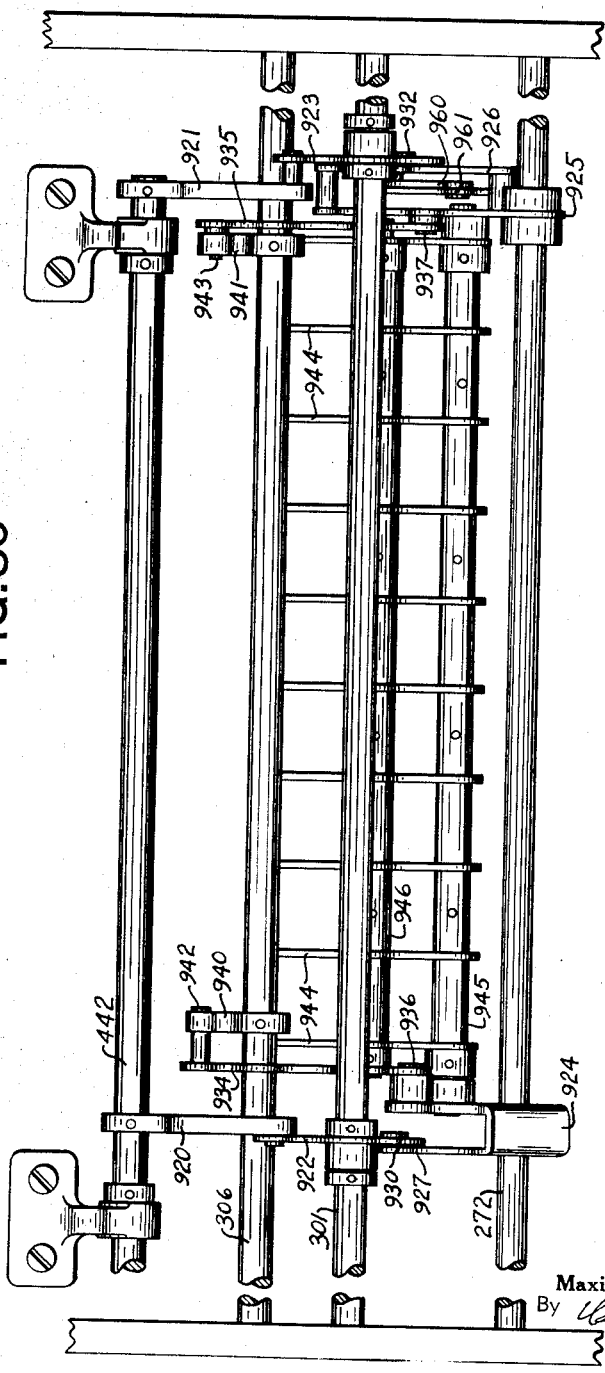
Fig. 59 is a back view of the repeat mechanism.

Two arms 920 and 921, Figs. 52, 55 and 59, are pinned to the shaft 442 and are connected, by pin-and-slot connections, to the cam levers 922 and 923 pivoted on the rod 381. Two brackets 924 and 925 are pivoted on the rod 272, the bracket 925 having a bar 926 secured between its two arms, and off-set from the bracket. An arm 927 on the bracket 924 carries a roller 930 operating in a cam slot 931 in the lever 922 and the bar 926 carries a roller 932 operating in a cam slot 933 in the lever 923. Two guides 934 and 935, Figs. 52 to 55 and 59, are pivoted on studs 936 and 937 on the brackets 924 and 925, and are slidably mounted on the shaft 306. Two arms 940 and 941 are pinned to the shaft 306 and have slotted ends to receive studs 942 and 943 on the upper arms of the guides 934 and 935. A series of aliners 944, one for each amount bank, are rigidly mounted on two rods 345 and 946, the rod 945 being pivoted, at its ends, in the brackets 924 and 925, and the rod 946 being slidably held in slots 947 and 950 in the guides 934 and 935. The amount differentials each have a segment 951, Figs. 27 and 55, pivoted on the rod 125, and having a nose 952, a shoulder 953, and a block 954. A lever 955 pivoted on a stud 956 on each differential rack 114, is spring pressed clockwise to the position shown, and cooperates with the blocks 954. A stud 957 is secured to each reset spider 105 and cooperates with the noses 952.

Figure 57:
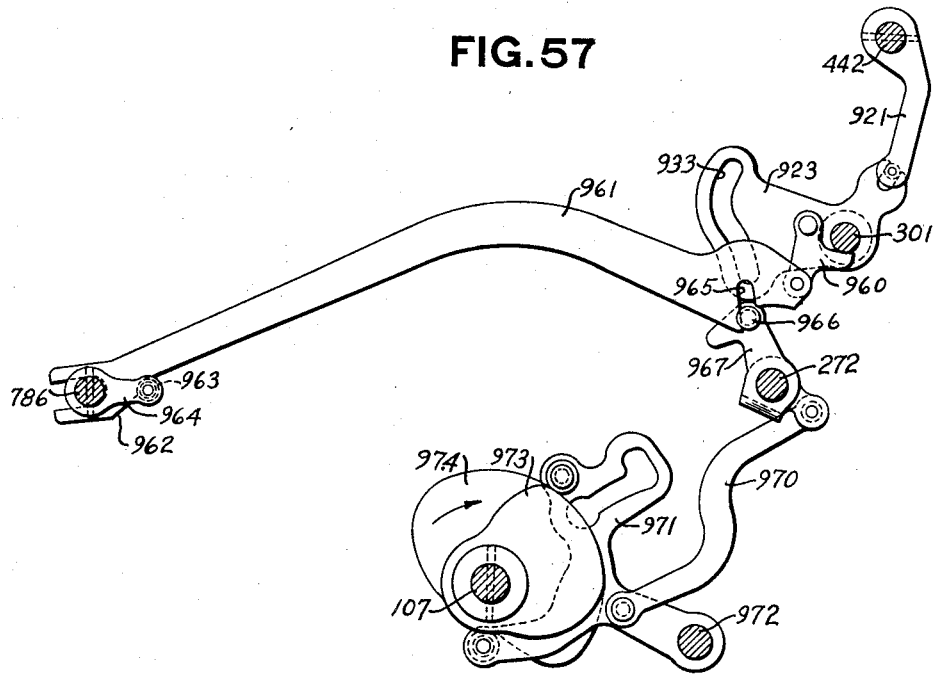
Fig. 57 is a side elevation of the mechanism controlling the removal of the zero stop pawls during a repeat operation.

A link 960, Figs. 57 and 59, is pivoted to the lever 923 and to one end of a cam slide 961. The other end of the cam slide is slidably mounted on the shaft 786, and has a cam surface 962 cooperating with a roller 963 on an arm 964 pinned to the shaft 786. A slot 965 in the cam slide 961 is adapted to be lowered upon a stud 966 on a lever 967 pivoted on the rod 272. A link 970 connects the lever 967 to an actuator 971, pivoted on the rod 972 and controlled, in its movements, by two cams 973 and 974 secured to the drive shaft 107.

Considering an adding operation, the shaft 306, Figs. 52, 55, and 59, is rocked clockwise, as explained under heading 1, raising the arms 940 and 941, the upper ends of the guides 934 and 935, and the forward ends of the aliners 944 sufficient to disengage the aliners from the segments 951, Figs. 27 and 55. Considering now only one of the differentials, the rack 114 and spider 105 then begin to rotate, the lever 955 striking the block 954 and the stud 957 being a step closer to the nose 952, when the mechanism reaches its "0" position. Assuming the differential is to travel to its "5" position, the lever 955 will be swung counter-clockwise against its spring tension, upon further movement of the rack 114, due to its shoulder 953 being held by the inertia of the beam 124 and its associated parts 126, 127, 130, etc. The stud 957 is now almost against the nose 952, and the beam 124 is against the under side of the rod 125. Further movement of the rack 114 causes the beam 124 to travel around the rod 125 as a center, lowering its rear end, and carrying with it its associated parts, the segment 951 being carried around by the lever 955. When the spider 105 reaches its "5" position, it is arrested at once, as explained under heading 1, the rack 114 and segment continuing until the latch 115 is entirely disengaged. This relative movement between the spider 105 and the rack 114 leaves a gap between the stud 957 and the nose 952, in their final upward positions. The shaft 306 is now rotated to its former position, lowering the aliner 944 in one of the notches in the segment 951 to hold it in its adjusted position. The differential then returns home without the segment 951.

Depression of the repeat key swings the arm 915, Fig. 20, to the left, as explained under the previous heading, and likewise swings arms 920 and 921, Figs. 52 and 55, to the left. This lowers the cam slots 931, 933, and swings the rollers 930, 932 and the brackets 924, 925 to the left, moving the guides 934, 935 upward and to the left, and disengaging the studs 942, 943 from the arms 940, 941. The resultant movement of the brackets 924, 925 and the guides 934, 935 moves the aliners 944 to the left and slightly upward, moving the segments 951 a short distance to the left, but still remaining engaged with the segments. This movement of the segments compensates for the relative movement made between the spider 105 and the rack 114, when the differential reached its highest position in the adding example just given.

The counter-clockwise movement of the lever 923, Fig. 57, also lowered the slide 961 over the stud 966, so that when the machine starts, the link 970 is pulled down and the link 961 and cam 962 are pulled to the left. This supplements the preliminary rotation of shaft 786, explained under heading 40, sufficiently to withdraw the zero stop pawls 103, Fig. 55, in the amount banks.

The differentials now move up for the repeating operation and the arms 940, 941 swing idly upward. Referring to the differential previously moved to the "5" position, when the spider 105, Fig. 27, reaches its "5" position, the stud 957 strikes the nose 952, arresting the movement of the spider and lever 106, Fig. 55, and disengaging the latch 115. The differential and slide 961 then return home, the number set up on the differentials being entered in the selected totalizer as in other operations, and the shaft returning home by aid of the spring 792, Fig. 15, and by the restoring mechanism. At the end of the operation the repeat key is released, allowing the alining mechanism to return home.

It is to be understood that altho this repeating movement is shown after an adding operation, the mechanism will function the same after any other operation performed by the machine.

42. Repeating operation using automatic selection of the totalizer

Assuming the balance totalizer has just been reset, the number taken therefrom being negative, and it is desired to enter this number in a separate totalizer intended to accumulate only negative amounts, it is necessary to depress only the repeat key, the number being automatically entered in the "New balance —" totalizer ordinarily controlled by key 141 in the third transaction bank.

While the repeat key 853, Fig. 37, is being depressed, the segments 951, Fig. 27, are moved forward, the studs 942, 943, Figs. 52 and 55, are disengaged from the arms 940, 941, and the slide 961, Fig. 57 is engaged with stud 966, as explained under heading 41. Also the link 857, Fig. 37, is moved to the left, releasing the machine, as explained under heading 39, and moving the stud 875 into operative relation with the arm 876, as explained under heading 37. The movement of these parts also operates the interlocks to prevent a mis-manipulation of the machine as explained under heading 40. As soon as the machine starts, the balance totalizer, engaged during the previous operation, is disengaged from the amount racks 114, Fig. 55, and at the same time the zero stop pawls 103 for the amount banks are withdrawn, as explained under heading 41. The shaft 306, Fig. 20, is then rotated, pulling the link 874 upward and withdrawing the zero stop pawl 142, Fig. 52 in the third transaction bank, as explained under heading 37. The differential in the third transaction bank then moves up until stopped in the "9" position by the stud 196, Fig. 52, shifting the rear totalizer line to its proper position. At the same time the amount differentials move up until their studs 957, Fig. 27, strike the noses 952, as explained under heading 41. The shaft 306 is then returned to its former position and this is followed by the rear totalizer line moving into engagement with the amount racks 114. The differentials then move down to home position, entering the set up amount on the totalizer, and at the same time the slide 961 returns home. The machine release mechanism is then restored as in other operations.

43. Repeating operation using manual selection of the totalizer

For this kind of operation, the machine must first be adjusted in the manner explained under heading 38. To release the machine, the desired transaction key and the repeat key are depressed, as explained under heading 39. The usual repeating operation is performed except that the transaction differentials are controlled by the depressed transaction key instead of by the mechanism explained under heading 37, and which is now idle, as explained under heading 38.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of a motor bar, transaction keys, a total key, a block normally moved by the transaction keys, another block normally moved by the motor bar, and means, released by the total key, to move both blocks.

2. In a machine of the class described, a total key, a latching device, a lever cooperating therewith, means, actuated by the lever, to control the machine during a total-taking operation, and means to withdraw the latching device when the total key is depressed, to release the machine for operation.

3. In a machine of the class described, a total key, a latching device, means controlled by the latching device to release the machine for operation, a lever, means moved by the lever to control a total taking operation, and means, acting with the lever to withdraw the latching device when a total key is depressed.

4. In a machine of the class described, the combination of a total key, means to release the machine for operation, the means including a latching device, means to withdraw the latching device upon depression of the total key, a shaft, blocks prohibiting the rotation of the shaft, and a series of levers, blocked from movement by the latching device, and adapted to move the blocks to permit the rotation of the shaft, when the latching device is moved by the total key.

5. In a machine of the class described, a row of total keys, a device to latch the machine against operation, locking devices, and means, actuated by the depression of any total key, to move the latching device the same amount upon the depression of any key, and the locking devices different amounts upon the depression of different keys.

6. In a machine of the class described, a total-taking mechanism, including a row of keys depressible to initiate a total-taking operation, two slides connected together, each movable different extents by the total keys, and a means, actuated by the slides in accordance with the combined movement of both slides, to release the machine.

7. In a machine of the class described, a total-taking mechanism including a row of keys depressible to initiate a total-taking operation, two slides, each movable by the total keys, and each being moved different distances by different keys, and means, connected with both slides and actuated thereby in accordance with the combined movement of the slides, to start the machine, the means receiving the same extent of movement from the depression of any key.

8. In a machine of the class described, a plurality of settable pawls, a row of keys, two key locking members actuated by the keys, one consisting of a shaft having abutments spaced thereon, and the other consisting of a plurality of yokes having abutments spaced thereon, both members cooperating mutually to restrict the depression of the keys by coacting with the pawls.

9. In a machine of the class described, a machine release mechanism including a slide shiftable in three directions, means to shift the slide in one direction at the beginning of a machine operation, means to shift the slide in the opposite direction at the end of the operation, and means to shift the slide in a third direction during a total-taking operation.

10. In a machine of the class described, a row of keys, two slides having cam slots coacting with the keys whereby the slides are moved different distances by depression of the several keys in the row, a movable member, and a means cooperating with the slides to secure an invariable movement of said member from the combined movement of the two slides, upon the depression of any key.

11. In a machine of the class described, a plurality of rows of totalizer controlling keys, a plurality of keys, each of which is associated with a particular row of controlling keys and the depression of which is controlled by depression of the controlling keys, two slides moved different extents by the controlled keys, the sum of the movements of the two slides always being the same, and a mechanism connected to each slide to cooperate in preventing the depression of any of the controlled keys other than the one corresponding to the row of controlling keys in which a key is depressed.

12. In a machine of the class described, a plurality of rows of totalizer controlling keys, a plurality of keys each of which is associated with a particular row of controlling keys and the depression of which is controlled by depression of the controlling keys, and a means associated with all the keys to prevent the depression of any controlled key if a controlling key in more than one row is depressed.

13. The combination of a total taking control device, a differential mechanism to adjust the total taking control device for adding or total taking operations, manipulative devices movable into position to control the differential mechanism, a stop normally in position to control the differential mechanism, a normally locked main operating mechanism, means, operated by the manipulative devices to release the main operating mechanism, and means operated by the releasing means to move the stop to ineffective position.

14. The combination of a total taking control device, a differential mechanism including complementary movable members to adjust the total taking device for adding or total taking operations, two groups of manipulative devices to control the differential mechanism, a stop located between the two groups of manipulative devices to control the differential mechanism, a normally locked drive means for the differential mechanism, means operated by the depression of the manipulative devices to release the drive means, and means operated by the releasing means to withdraw the stop, controlled by the operated manipulative device.

15. In a machine of the class described, a plurality of rows of totalizer selecting keys, a pawl settable by each row of keys, another row of keys, two slides operated by the second-named keys, a train of mechanism including a series of yokes connected with and operated by one of said slides, and a second train of mechanism including a shaft and abutments thereon connected with and operated by the other of said slides, the two trains of mechanism cooperating with the settable pawls to selectively restrict the depression of all of said keys.

16. In a machine of the class described, a row of keys, two slides, means between the slides and the keys whereby the slides are actuated different extents by the keys, the sum of the movements of both slides being the same for any key, a settable member, and connections between the slides and the settable member, whereby the settable member is always moved the same extent.

17. In a machine of the class described, the combination of a machine releasing mechanism, including a slide longitudinally reciprocable, said slide also mounted for pivotal movement in the plane of its reciprocation, and an element coacting with said slide when the slide is pivotally moved to lock the slide against reciprocation.

18. In a machine of the class described, the combination of a machine releasing mechanism, including a slide longitudinally movable in one direction to start a machine operation, and an element mounted adjacent said slide, said slide also mounted for pivotal movement to engage said element, whereby the slide is locked against longitudinal movement.

19. In a machine of the class described, the combination of a machine release mechanism, including a reciprocable and rockable slide movable in one direction to allow the machine to operate and in the other direction to arrest the machine operation, an element coacting with the slide, and means for rocking the slide into engagement with the element to prevent reciprocation of the slide and thereby prevent restoration of the machine release mechanism.

20. In a machine of the class described, the combination of an oscillatable machine release shaft, a reciprocable slide connected thereto, means to move the slide in one direction to oscillate the shaft in one direction to release the machine, means to move the slide in the opposite direction to restore the slide and shaft at the end of the machine operation, said slide also mounted for pivotal movement in the plane of its reciprocation, and means actuated during total taking operations to give the slide a pivotal movement.

21. In a machine of the class described, the combination of an oscillatable machine release shaft, a reciprocable slide connected thereto, means to move the slide in one direction to oscillate the shaft in one direction to release the machine, means to move the slide in the opposite direction to restore the slide and shaft at the end of the machine operation, said slide also mounted for pivotal movement in the plane of its reciprocation, a notch in the slide, a stud in the frame of the machine, and means actuated during total taking operations coacting with the slide to give the slide a pivotal movement whereby the notch engages the stud to lock the slide against reciprocation in the second-named direction.

22. In a machine of the class described, a plurality of settable pawls, a row of keys, and two key locking mechanisms actuated by the keys, one locking mechanism including a member having abutments spaced thereon and the other locking mechanism including a member having abutments spaced thereon, the abutments of both mechanisms mutually cooperating with the pawls to control the operation of the keys.

23. In a machine of the class described, a group of manipulative control devices; differential mechanisms having means thereon cooperable with the devices whereby the mechanism is operable various extents by the operation of the devices; a plurality of groups of manipulative control devices; a control member related to each of the plurality of groups of devices; means whereby the devices of each group move the related control member to operative position, and control means on said members to coact with the differential mechanism to govern its extent of movement whereby only the device of the first mentioned group can be operated which will give the differential mechanism a movement equal to the amount allowed by the control member.

24. In a machine of the class described, a machine release means; a total taking mechanism including a plurality of manipulative control devices; a plurality of interconnected members, each having means thereon cooperable with the devices to move the members various predetermined extents upon operation of the devices; and means actuated by the members, in accordance with their joint movement, to release the machine release means.

25. In a machine of the class described, the combination of a machine release key; a transaction key; a total key; a machine release mechanism; a latch for said release mechanism; means actuated by the machine release key to move the latch to unlatching position; a second latch for said machine release mechanism; means actuated by the transaction key to move the latch to unlatching position; and means controlled by the total key to simultaneously move both latches to unlatching position upon the depression of the total key.

26. In a machine of the class described, a row of total keys; means to latch the machine against operation; blocking devices; control members cooperable with said blocking devices and movable different distances relative thereto; and means actuated by the depression of any total key to impart the same amount of movement to the latching means upon the depression of any key, and to move the control means different distances upon the depression of different keys.

27. In a machine of the class described, machine release mechanism including an oscillatable member; a reciprocable slide pivotally connected to said member; a stationary stud adjacent the slide; means to move the slide in one direction to oscillate the member in one direction to release the machine for operation; restoring means normally operable to engage the slide to move the slide in the opposite direction to restore the slide and machine release mechanism during a machine operation; and total taking control mechanism including a cycle controller, said cycle controller having means to give the slide a pivotal movement to move said slide out of engagement with its restoring means and into engagement with the stud to lock the slide against restoration during a certain part of a total taking operation.

28. In a machine of the class described, the combination of a plurality of amount keys; a detent associated therewith; means cooperable with the detent to lock the keys against operation; machine release means for releasing the machine for operation; total taking control means; and means conditioned for operation by the total taking control means, and operated by the machine release means, to operate the locking means for the amount keys in a total taking operation.

MAXIMILIAN M. GOLDBERG.